(12) United States Patent
Meyer

(10) Patent No.: US 8,128,478 B2
(45) Date of Patent: Mar. 6, 2012

(54) GAMING SYSTEM, GAMING DEVICE, AND METHOD FOR PROVIDING A GAME HAVING A FIRST EVALUATION BASED ON DRAWN SYMBOLS AND A SECOND EVALUATION BASED ON AN ORDER IN WHICH THE SYMBOLS ARE DRAWN

(75) Inventor: Adam M. Meyer, Reno, NV (US)

(73) Assignee: IGT, Reno, NV (US)

( * ) Notice: Subject to any disclaimer, the term of this patent is extended or adjusted under 35 U.S.C. 154(b) by 649 days.

(21) Appl. No.: 12/267,873

(22) Filed: Nov. 10, 2008

(65) Prior Publication Data

US 2010/0120489 A1    May 13, 2010

(51) Int. Cl.
*A63F 9/24* (2006.01)
*A63F 13/00* (2006.01)

(52) U.S. Cl. .......................................... 463/19
(58) Field of Classification Search ...................... 463/19
See application file for complete search history.

(56) References Cited

U.S. PATENT DOCUMENTS

| | | |
|---|---|---|
| 4,033,588 A | 7/1977 | Watts |
| 4,157,829 A | 6/1979 | Goldman et al. |
| 4,291,882 A | 9/1981 | Del Monte |
| 4,335,809 A | 6/1982 | Wain |
| 4,339,798 A | 7/1982 | Hedges et al. |
| 4,364,567 A | 12/1982 | Goott |
| 4,467,424 A | 8/1984 | Hedges et al. |
| 4,494,197 A | 1/1985 | Troy et al. |
| 4,582,324 A | 4/1986 | Koza et al. |
| 4,689,742 A | 8/1987 | Troy et al. |
| 4,695,053 A | 9/1987 | Vazquez et al. |
| 4,756,531 A | 7/1988 | DiRe et al. |
| 4,760,527 A | 7/1988 | Sidley |
| 4,775,155 A | 10/1988 | Lees |
| 4,805,907 A | 2/1989 | Hagiwara |

(Continued)

FOREIGN PATENT DOCUMENTS

GB    2374294    10/2002

(Continued)

OTHER PUBLICATIONS

Big Top Keno Advertisement, written by Aristocrat, published Oct. 2000.
Bingo Advertisement, written by Casino Data Systems, published 1998.
Bingo Brasil Advertisement, written by Unidesa Gaming, published prior to 2003.

(Continued)

*Primary Examiner* — Dmitry Suhol
*Assistant Examiner* — Michael Grant
(74) *Attorney, Agent, or Firm* — K&L Gates LLP

(57) ABSTRACT

A gaming system displays a plurality of bingo cards each containing at least one column, each column having at least one square. Each square includes a random number selected from a range associated with that column. The gaming system displays each bingo card and an initially-empty accumulation area. Balls are drawn from a pool of balls, each ball associated with a number. As the balls are drawn, any square on any of the bingo cards containing the number of the drawn ball is marked with a suitable indicator. A primary award is provided for combinations of marked squares on one or more of the bingo cards. The gaming system displays the balls in the accumulated area in the order in which they are drawn. The gaming system provides a secondary award for combinations of balls displayed in the accumulation area.

23 Claims, 10 Drawing Sheets

U.S. PATENT DOCUMENTS

| | | |
|---|---|---|
| 4,815,741 A | 3/1989 | Small |
| 4,817,951 A | 4/1989 | Crouch et al. |
| 4,836,546 A | 6/1989 | DiRe et al. |
| 4,836,548 A | 6/1989 | Chittenden |
| 4,837,728 A | 6/1989 | Barrie et al. |
| 4,842,278 A | 6/1989 | Markowicz |
| 4,856,787 A | 8/1989 | Itkis |
| 4,875,686 A | 10/1989 | Timms |
| 4,995,610 A | 2/1991 | Paoletti |
| 4,999,001 A | 3/1991 | Johnson, Jr. |
| 5,042,809 A | 8/1991 | Richardson |
| 5,046,737 A | 9/1991 | Fienberg |
| 5,083,800 A | 1/1992 | Lockton |
| 5,092,598 A | 3/1992 | Kamille |
| 5,100,139 A | 3/1992 | Di Bella |
| 5,116,049 A | 5/1992 | Sludikoff et al. |
| 5,158,293 A | 10/1992 | Mullins |
| 5,192,076 A | 3/1993 | Komori |
| 5,242,163 A | 9/1993 | Fulton |
| 5,265,874 A | 11/1993 | Dickinson et al. |
| 5,265,877 A | 11/1993 | Boylan et al. |
| 5,273,281 A | 12/1993 | Lovell |
| 5,276,312 A | 1/1994 | McCarthy |
| 5,282,620 A | 2/1994 | Keesee |
| 5,324,035 A | 6/1994 | Morris et al. |
| 5,333,868 A | 8/1994 | Goldfarb |
| 5,393,057 A | 2/1995 | Marnell |
| 5,398,932 A | 3/1995 | Eberhardt et al. |
| 5,401,024 A | 3/1995 | Simunek |
| 5,407,199 A | 4/1995 | Gumina |
| 5,577,971 A | 11/1996 | File |
| 5,586,937 A | 12/1996 | Menashe |
| 5,611,729 A | 3/1997 | Schumacher et al. |
| 5,611,730 A | 3/1997 | Weiss |
| 5,628,684 A | 5/1997 | Bouedec |
| 5,639,089 A | 6/1997 | Matsumoto et al. |
| 5,647,798 A | 7/1997 | Falciglia |
| 5,651,735 A | 7/1997 | Baba |
| 5,657,991 A | 8/1997 | Camarato |
| 5,664,998 A | 9/1997 | Seelig et al. |
| 5,674,128 A | 10/1997 | Holch et al. |
| 5,683,295 A | 11/1997 | Frain |
| 5,718,631 A | 2/1998 | Invencion |
| 5,755,619 A | 5/1998 | Matsumoto et al. |
| 5,762,552 A | 6/1998 | Vuong et al. |
| 5,769,714 A | 6/1998 | Wiener et al. |
| 5,769,716 A | 6/1998 | Saffari et al. |
| RE35,864 E | 7/1998 | Weingardt |
| 5,779,545 A | 7/1998 | Berg et al. |
| 5,797,794 A | 8/1998 | Angell |
| 5,800,269 A | 9/1998 | Holch et al. |
| 5,833,537 A | 11/1998 | Barrie |
| 5,833,538 A | 11/1998 | Weiss |
| 5,855,514 A | 1/1999 | Kamille |
| 5,871,398 A | 2/1999 | Schneier et al. |
| 5,909,875 A | 6/1999 | Weingardt |
| 5,935,001 A | 8/1999 | Baba |
| 5,935,002 A | 8/1999 | Falciglia |
| 5,944,606 A | 8/1999 | Gerow |
| 5,949,042 A | 9/1999 | Dietz, II et al. |
| 5,954,582 A | 9/1999 | Zach |
| 5,970,143 A | 10/1999 | Schneier et al. |
| 5,971,849 A | 10/1999 | Falciglia |
| 5,980,384 A | 11/1999 | Barrie |
| 5,997,400 A | 12/1999 | Seelig et al. |
| 6,017,032 A | 1/2000 | Grippo et al. |
| 6,024,640 A | 2/2000 | Walker et al. |
| 6,033,306 A | 3/2000 | De Souza |
| 6,077,162 A | 6/2000 | Weiss |
| 6,079,711 A * | 6/2000 | Wei et al. ................ 273/269 |
| 6,089,976 A | 7/2000 | Schneider et al. |
| 6,089,982 A | 7/2000 | Holch et al. |
| 6,099,408 A | 8/2000 | Schneier et al. |
| 6,102,400 A | 8/2000 | Scott et al. |
| 6,117,009 A | 9/2000 | Yoseloff |
| 6,129,632 A | 10/2000 | Luciano |
| 6,146,272 A | 11/2000 | Walker et al. |
| 6,168,521 B1 | 1/2001 | Luciano et al. |
| 6,183,361 B1 | 2/2001 | Cummings et al. |
| 6,203,428 B1 | 3/2001 | Giobbi et al. |
| 6,210,275 B1 | 4/2001 | Olsen |
| 6,210,276 B1 | 4/2001 | Mullins |
| 6,210,279 B1 | 4/2001 | Dickinson |
| 6,217,448 B1 | 4/2001 | Olsen |
| 6,220,961 B1 | 4/2001 | Keane et al. |
| 6,241,606 B1 | 6/2001 | Riendeau et al. |
| 6,250,685 B1 | 6/2001 | Walker et al. |
| 6,254,480 B1 | 7/2001 | Zach |
| 6,270,407 B1 | 8/2001 | Dodge |
| 6,273,820 B1 | 8/2001 | Haste, III |
| 6,280,328 B1 | 8/2001 | Holch et al. |
| 6,283,855 B1 | 9/2001 | Bingham |
| 6,309,299 B1 | 10/2001 | Weiss |
| 6,315,291 B1 | 11/2001 | Moody |
| 6,325,716 B1 | 12/2001 | Walker et al. |
| 6,336,862 B1 | 1/2002 | Byrne |
| 6,358,151 B1 | 3/2002 | Enzminger et al. |
| 6,364,313 B1 | 4/2002 | Moody |
| 6,368,213 B1 | 4/2002 | McNabola |
| 6,368,214 B1 | 4/2002 | Luciano |
| 6,368,218 B2 | 4/2002 | Angell, Jr. |
| 6,398,644 B1 | 6/2002 | Perrie et al. |
| 6,398,645 B1 | 6/2002 | Yoseloff |
| 6,402,614 B1 | 6/2002 | Schneier et al. |
| 6,419,583 B1 | 7/2002 | Crumby et al. |
| 6,425,823 B1 | 7/2002 | Byrne |
| 6,443,837 B1 | 9/2002 | Jaffe et al. |
| 6,450,885 B2 | 9/2002 | Schneier et al. |
| 6,454,648 B1 | 9/2002 | Kelly et al. |
| RE37,885 E | 10/2002 | Acres et al. |
| 6,464,582 B1 | 10/2002 | Baerlocher et al. |
| 6,475,086 B2 | 11/2002 | Zach |
| 6,478,677 B1 | 11/2002 | Moody |
| 6,508,711 B1 | 1/2003 | Ono |
| 6,514,144 B2 | 2/2003 | Riendeau et al. |
| 6,524,184 B1 | 2/2003 | Lind et al. |
| 6,527,638 B1 | 3/2003 | Walker et al. |
| 6,533,660 B2 | 3/2003 | Seelig et al. |
| 6,533,664 B1 | 3/2003 | Crumby |
| 6,537,150 B1 | 3/2003 | Luciano et al. |
| 6,599,193 B2 | 7/2003 | Baerlocher et al. |
| 6,609,973 B1 | 8/2003 | Weiss |
| 6,645,071 B2 | 11/2003 | Perrie et al. |
| 6,656,044 B1 * | 12/2003 | Lewis ................ 463/19 |
| 6,702,699 B2 | 3/2004 | Touhey et al. |
| 6,729,961 B1 | 5/2004 | Millerschone |
| 6,739,970 B2 | 5/2004 | Luciano |
| 6,749,500 B1 | 6/2004 | Nelson et al. |
| 6,755,238 B1 | 6/2004 | Hirokawa |
| 6,755,738 B2 | 6/2004 | Glasson et al. |
| 6,764,397 B1 | 7/2004 | Robb |
| 6,824,465 B2 | 11/2004 | Luciano, Jr. |
| 6,840,858 B2 | 1/2005 | Adams |
| 6,855,055 B2 | 2/2005 | Perrie et al. |
| 6,890,255 B2 | 5/2005 | Jarvis et al. |
| 6,921,334 B1 | 7/2005 | Bennett |
| 7,156,741 B2 | 1/2007 | Hornik et al. |
| 7,179,167 B2 | 2/2007 | deKeller |
| 7,322,886 B2 | 1/2008 | Manz |
| 7,470,186 B2 | 12/2008 | Cannon |
| 7,837,550 B2 * | 11/2010 | Odom ................ 463/19 |
| 7,955,170 B2 * | 6/2011 | Gail et al. ........ 463/19 |
| 7,959,509 B2 * | 6/2011 | Saffari et al. ........ 463/27 |
| 2002/0010013 A1 | 1/2002 | Walker et al. |
| 2002/0010015 A1 | 1/2002 | Acres |
| 2002/0045472 A1 | 4/2002 | Adams |
| 2002/0058545 A1 | 5/2002 | Luciano |
| 2002/0072404 A1 | 6/2002 | Gerow |
| 2002/0082070 A1 | 6/2002 | Macke et al. |
| 2002/0098882 A1 | 7/2002 | Lind et al. |
| 2002/0098883 A1 | 7/2002 | Packes, Jr. et al. |
| 2002/0111214 A1 | 8/2002 | Lind et al. |
| 2002/0113369 A1 | 8/2002 | Weingardt |
| 2002/0169018 A1 | 11/2002 | Schneier et al. |
| 2003/0034605 A1 | 2/2003 | Hunter et al. |
| 2003/0064793 A1 | 4/2003 | Baerlocher et al. |
| 2003/0073480 A1 | 4/2003 | Thomas et al. |

| | | | |
|---|---|---|---|
| 2003/0104856 A1 | 6/2003 | Wolf | |
| 2003/0104865 A1 | 6/2003 | Itkis et al. | |
| 2003/0127793 A1 | 7/2003 | Adams | |
| 2003/0181234 A1 | 9/2003 | Falciglia, Sr. | |
| 2003/0186736 A1 | 10/2003 | Benbrahim | |
| 2003/0193136 A1 | 10/2003 | Walker et al. | |
| 2003/0216166 A1 | 11/2003 | Baerlocher et al. | |
| 2004/0106445 A1 | 6/2004 | Perrie et al. | |
| 2004/0152509 A1 | 8/2004 | Hornik et al. | |
| 2004/0178579 A1 | 9/2004 | Lowell et al. | |
| 2004/0224749 A1 | 11/2004 | Seelig et al. | |
| 2004/0242310 A1 | 12/2004 | Perkins | |
| 2004/0259620 A1* | 12/2004 | Roy et al. | 463/13 |
| 2005/0014553 A1 | 1/2005 | Byrne | |
| 2005/0043079 A1 | 2/2005 | Huang | |
| 2005/0059467 A1 | 3/2005 | Saffari et al. | |
| 2005/0059469 A1* | 3/2005 | Gail et al. | 463/19 |
| 2005/0075161 A1* | 4/2005 | McGlone et al. | 463/19 |
| 2005/0101379 A1 | 5/2005 | Falconer | |
| 2005/0101387 A1* | 5/2005 | Wolf | 463/42 |
| 2005/0119042 A1 | 6/2005 | Chamberlain et al. | |
| 2005/0164772 A1 | 7/2005 | Lind et al. | |
| 2005/0164773 A1* | 7/2005 | Lind et al. | 463/19 |
| 2005/0181860 A1 | 8/2005 | Nguyen et al. | |
| 2005/0187014 A1 | 8/2005 | Saffari et al. | |
| 2005/0227753 A1 | 10/2005 | Luciano, Jr. | |
| 2006/0025198 A1 | 2/2006 | Gail et al. | |
| 2006/0040727 A1 | 2/2006 | Lind et al. | |
| 2006/0040729 A1 | 2/2006 | Manz | |
| 2006/0082056 A1 | 4/2006 | Kane et al. | |
| 2006/0160603 A1 | 7/2006 | Lulek | |
| 2006/0172799 A1 | 8/2006 | Kane et al. | |
| 2006/0178198 A1 | 8/2006 | Fasbender et al. | |
| 2006/0205468 A1 | 9/2006 | Saffari et al. | |
| 2006/0287057 A1 | 12/2006 | Osawa | |
| 2007/0060248 A1 | 3/2007 | Rodgers et al. | |
| 2007/0093287 A1* | 4/2007 | Brunelle et al. | 463/19 |
| 2007/0105614 A1 | 5/2007 | Hornik et al. | |
| 2007/0117608 A1 | 5/2007 | Roper et al. | |
| 2007/0155471 A1 | 7/2007 | Powell et al. | |
| 2007/0155472 A1 | 7/2007 | Gail et al. | |
| 2007/0173313 A1 | 7/2007 | Bienvenue | |
| 2008/0054564 A1 | 3/2008 | Siegel et al. | |
| 2009/0197663 A1* | 8/2009 | Schultz | 463/18 |

FOREIGN PATENT DOCUMENTS

| | | |
|---|---|---|
| WO | WO 02/092181 | 11/2002 |
| WO | WO 02/097749 | 12/2002 |
| WO | WO 2004/014502 | 2/2004 |
| WO | WO 2006/074156 | 7/2006 |
| WO | WO 2007/044785 | 4/2007 |
| WO | WO 2007/075486 | 7/2007 |
| WO | WO 2007/078828 | 7/2007 |
| WO | WO 2008/091468 | 7/2008 |

OTHER PUBLICATIONS

Bingo Party Advertisement, written by Amatic Industries, published 2001.
Bingo Slot Advertisement, written by Unidesa Gaming, published prior to 2003.
Bingo Slots Advertisement, written by Odds on Gaming, published prior to 2003.
Bingo Wizard Advertisement, written by Applied Concepts, published 2002.
Bonus Bingo Advertisement, written by Unidesa Gaming, published prior to 2003.
Canadian Bingo Advertisement, written by Unidesa Gaming, published prior to 2003.
Cash Keno Paytable, written by IGT, available prior to 2003.
Dual Screen Keno Machine Picture Advertisement, written by Acres Gaming & Technology, published prior to 2003.
Electronic Pull Tabs Advertisement, written by 21st Century Gaming, published prior to 2002.
Five Card Instant Bingo Advertisement, written by IGT, published 2000.
Four Card Keno Game Screen Advertisement, written by IGT, published prior to 2003.
Instant Bingo Advertisement, written by IGT, published prior to 2003.
Jackpot Bingo advertisement, written by Casino Data Systems, published prior to Apr. 2001.
Mega Millions game description, http://www.wikipedia.org/wiki/Mega_Millions, available prior to Nov. 2007.
Party Time Bingo Advertisement, written by Astra Games Limited, published prior to 2003.
Play it Again Advertisement, written by International Gamco, Inc., published 2000.
Reel Bingo Advertisement, written by B Soft, published prior to 2003.
ReelTouch Bingo Advertisement, written by Sodak Gaming, published 2004.
Slingo Games, written by Slingo.com Slingo Games (website: www.slingo.com/games/online/game.php), printed on Apr. 25, 2003.
Star Spangled Keno, Advertisement, written by Silicon Gaming, published 2001.
Triple Diamond Keno Paytable, written by IGT, available prior to 2003.

* cited by examiner

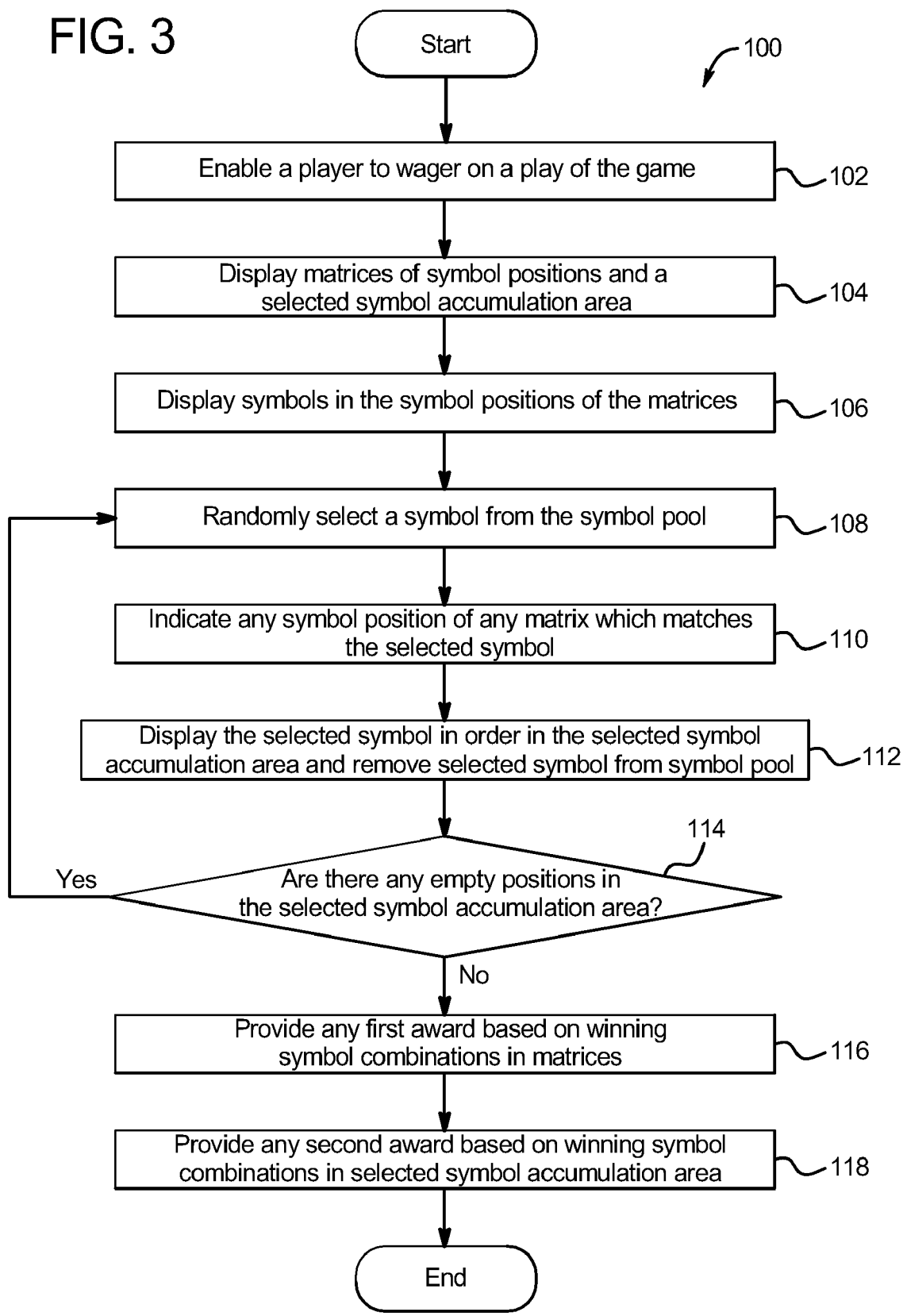

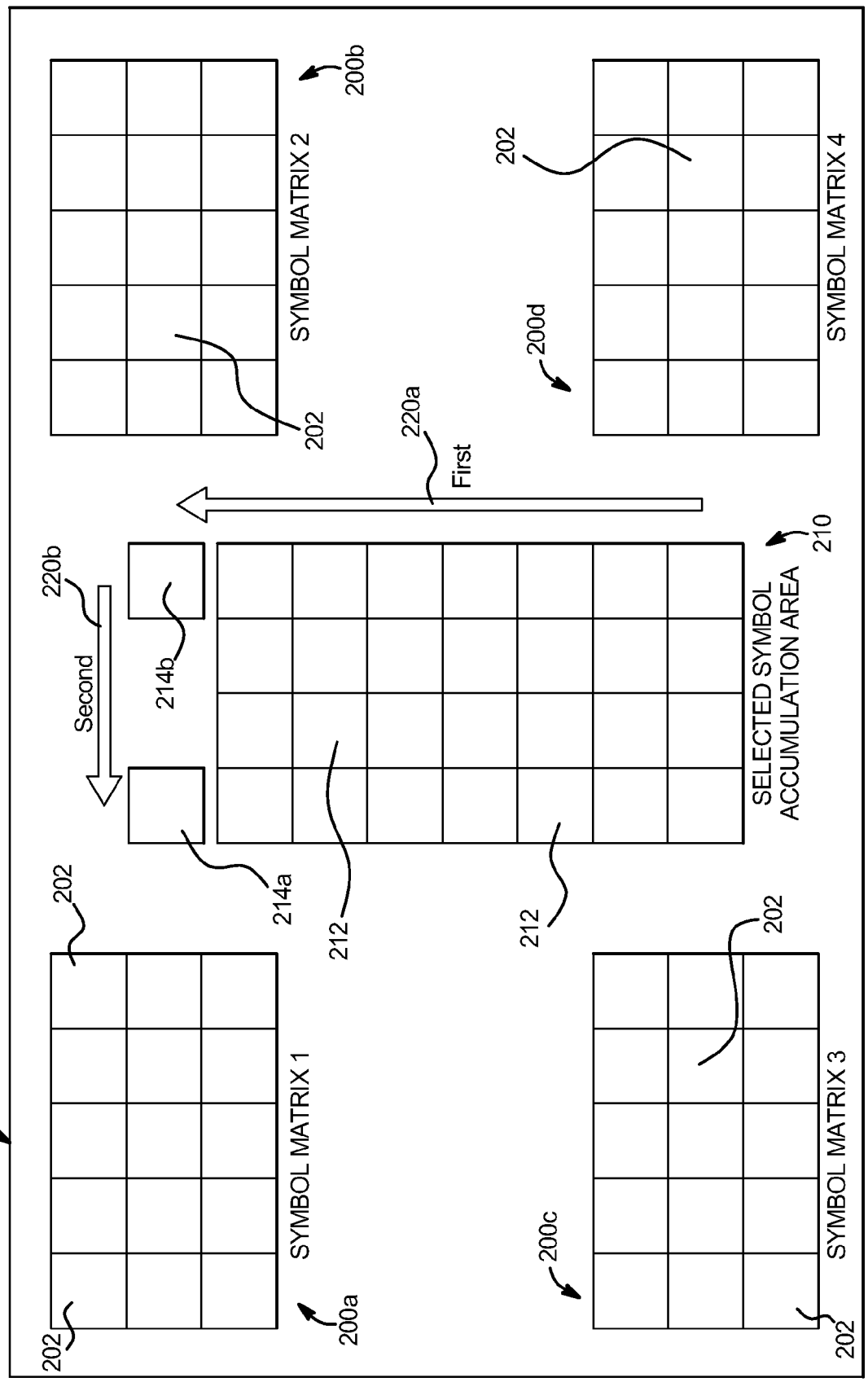

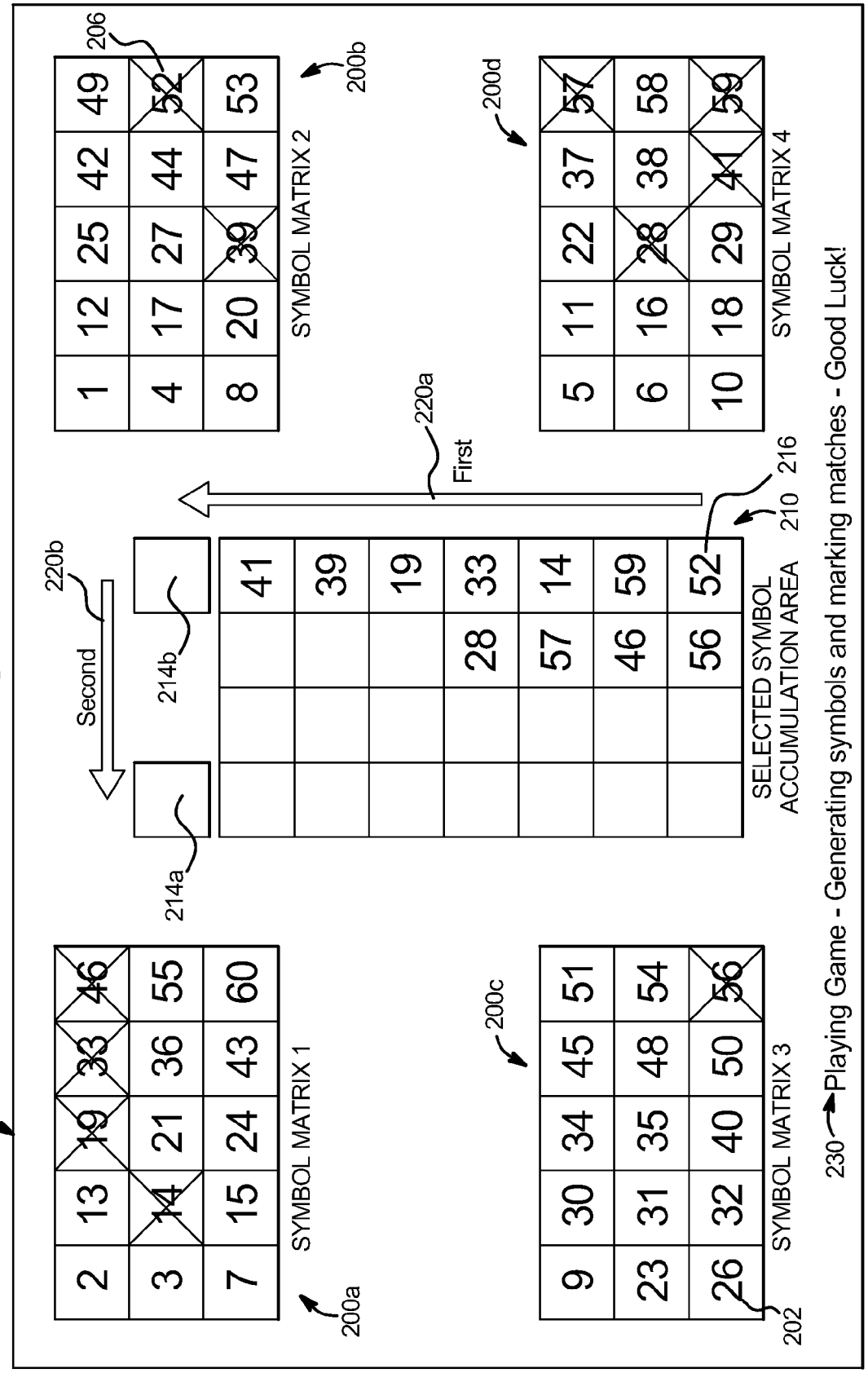

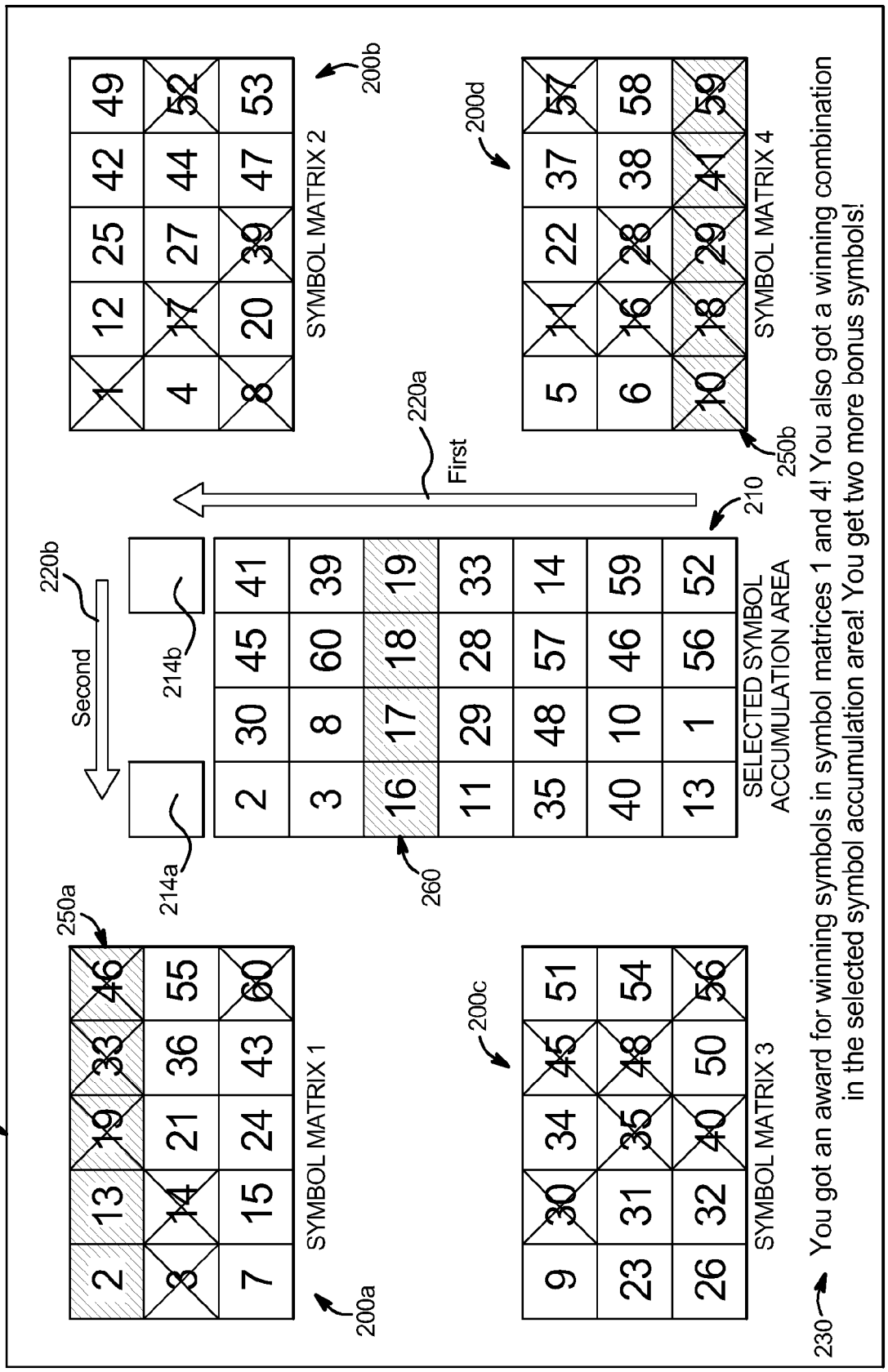

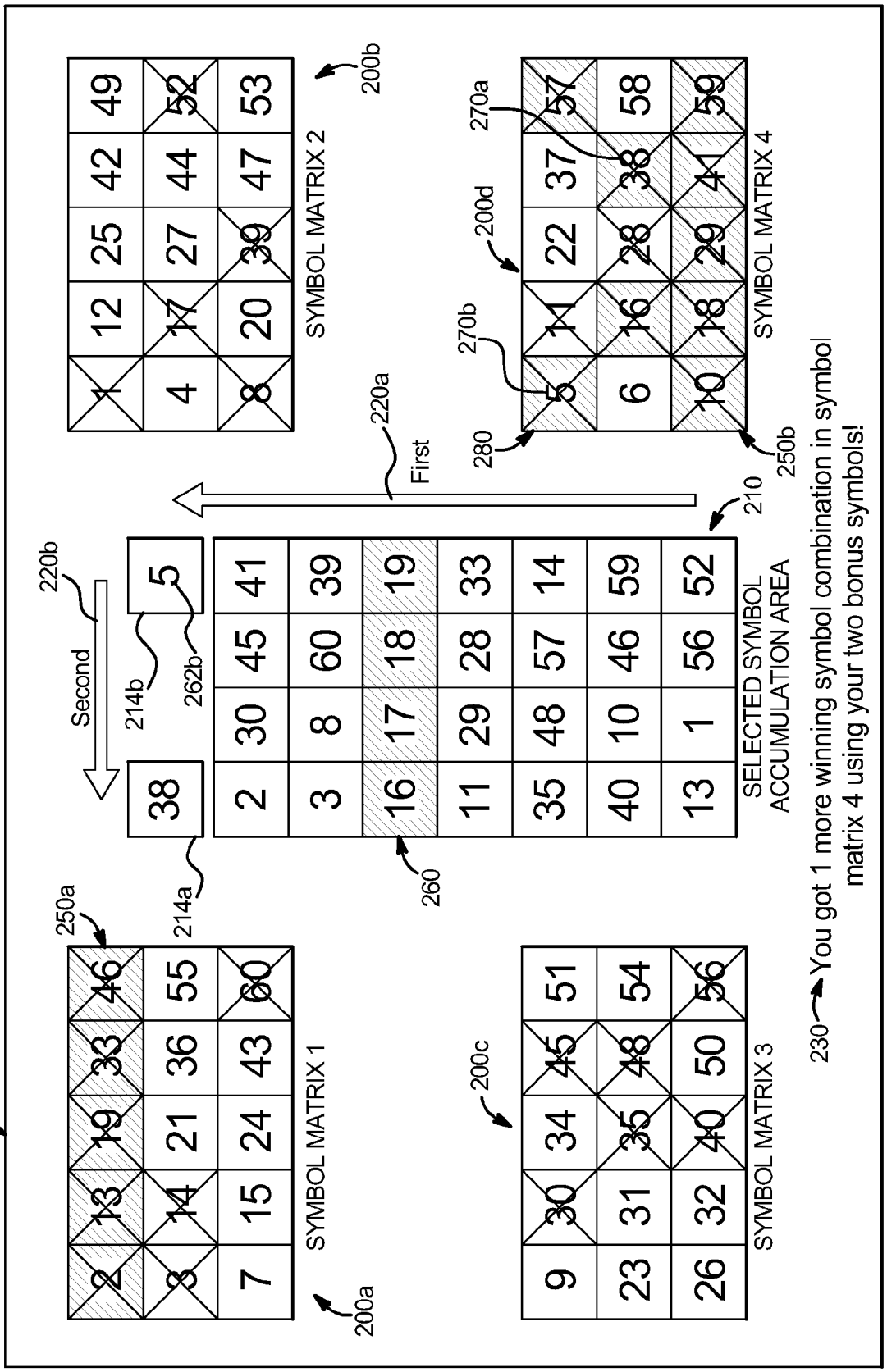

GAMING SYSTEM, GAMING DEVICE, AND METHOD FOR PROVIDING A GAME HAVING A FIRST EVALUATION BASED ON DRAWN SYMBOLS AND A SECOND EVALUATION BASED ON AN ORDER IN WHICH THE SYMBOLS ARE DRAWN

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Such gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player may vary.

Certain known gaming machines are configured to provide an award based on an outcome of a bingo-type primary or base game. In these gaming machines, a bingo card is provided which is divided into a matrix of positions or squares. For example, a gaming machine may provide a bingo card having five columns of five positions each. Certain known gaming machines assign a symbol (such as a numeral) to each of the positions of the bingo card. These symbols may be assigned based on a range associated with the positions of the bingo card. For example, a different range may be associated with the positions of each column of a bingo card, and the gaming machine may assign a position from the associated range to each of the positions.

Such gaming machines are configured to select or draw a plurality of symbols from a pool of symbols for a play of the game. The symbols are typically randomly selected from the pool of symbols, and typically may be selected only once for a single play of the bingo-type game. The range of symbols in the pool of symbols includes the ranges associated with each of the positions of the bingo card. For each symbol selected from the pool of symbols, the gaming machine marks or otherwise indicates any position of the bingo card with an assigned symbol which matches the selected or drawn symbol. The quantity of symbols selected from the pool for a single play of the bingo-type game can vary, but typically is substantially less the quantity of symbols in the pool of symbols.

These gaming machines provide awards to players wagering on plays of the bingo-type primary or base games based on combinations of the positions of the bingo card which are indicated after the plurality of symbols are selected. Specifically, these gaming machines analyze a pattern or spatial arrangement of indicated positions on the bingo card and provide an award based on that pattern or spatial arrangement. For example, such gaming machines may provide awards for a row of indicated positions, a column of indicated positions, a diagonal line of indicated positions, or other suitable patterns or spatial arrangements of indicated positions.

Certain known gaming machines also provide bingo-type games in which a player can place a wager on one or more bonus symbols which are drawn for a play of the game. Upon receiving an appropriate wager, such known gaming machines select at least one additional bonus symbol from the pool of symbols. For each bonus symbol drawn, the gaming machine indicates any matching positions and provides any awards based on the spatial relationships of the indicated positions. Thus, rather than drawing thirty symbols for a play of the game, an appropriate wager may cause such a gaming machine to draw thirty-two symbols.

There is a continuing need to increase the excitement and entertainment for players of gaming machines providing bingo-type games such as those described above. There is also need for new ways of providing better gaming experiences and environments at gaming machines. There is a further need for increasing the number of awards provided to a player for a single wager on a play of a bingo-type primary game.

SUMMARY

The present disclosure relates generally to gaming systems, gaming devices, and methods for providing a game having two evaluations of a set of generated symbols, and more particularly to a gaming system, gaming device, and method for providing a bingo-type game having a first award evaluation based on combinations of symbols indicated on one or more bingo cards which match a plurality of randomly selected displayed symbols and a second award evaluation based on the order in which the displayed randomly selected symbols are selected for the first evaluation.

In various embodiments, the gaming system enables a player to wager on a play of a game including a plurality of separate matrices, sets, or collections of symbol positions. In one embodiment, the gaming system displays at least one matrix of symbol positions including a plurality of symbol positions arranged in at least one row and in at least one column. In one embodiment, the gaming system includes a symbol pool from which a plurality of symbols are selected to populate or fill the plurality of matrices of symbol positions prior to drawing or selecting any symbols for a play of the game. For the play of the game, the gaming system sequentially selects a plurality of symbols from the symbol pool. As each symbol is selected from the symbol pool, the gaming system: (a) determines whether the selected symbol is displayed in a symbol position of any displayed matrix of symbol positions (b) indicates that a symbol of one of the symbol positions of one of the matrices of symbols has been selected if such a match occurs, and (c) sequentially displays the selected symbol in an additional or separate selected symbol accumulation area. In one embodiment, the gaming system provides a first award, if any, based on winning symbol combinations of the selected symbols in the symbol positions. For example, if the matched symbols are spatially related to form a horizontal line, the gaming system may provide a first award. In one embodiment, the gaming system provides a second award, if any, based on any winning combinations of symbols displayed in the separate selected symbol accumulation area. For example, if the symbols displayed in the separate selected symbol accumulation area form a winning symbol combination, such as a row of an ascending sequence of numbers, the gaming system provides the second award.

In one embodiment, the gaming system disclosed herein displays a plurality of matrices of symbol positions. In this embodiment, the gaming system displays each of the matrices of symbol positions as a bingo card having a plurality of columns of symbol positions and a plurality of rows of symbol positions. In one embodiment, each of the bingo cards can display a plurality of symbols as randomly positioned in the symbol positions of that bingo card. In an alternative embodiment, each symbol position of each bingo card is associated with a range of symbols and will only display symbols from the associated range of symbols.

In one embodiment, the gaming system also displays a separate selected symbol accumulation area. In one such embodiment, the gaming system displays the separate selected symbol accumulation area as a matrix of initially empty symbol positions arranged in a plurality of rows and a plurality of columns. In one embodiment, the selected symbol accumulation area also includes at least one bonus symbol position for displaying at least one bonus symbol.

For a play of the game disclosed herein, the gaming system in one embodiment fills the plurality of symbol positions of the bingo cards by assigning a different symbol from a symbol pool to each symbol position of each bingo card and displaying the selected symbol in the appropriate symbol position.

In one embodiment, the gaming system randomly selects a first one of a sequence of the symbols from the symbol pool. The gaming system determines whether any of the displayed symbols in the symbol matrices match the selected symbol. If such a match occurs, the gaming system displays an indicator associated with the symbol position displaying the matched symbol. For example, if a numeric symbol having a value of eight is displayed in one of the symbol matrices, and a symbol having a value of sixteen is selected during the play of the game, the gaming system displays an "X" symbol associated with the eight symbol of the appropriate symbol matrix.

In one embodiment, the gaming system also displays each selected symbol in the selected symbol accumulation area based on the order in which the symbol was selected. For example, the gaming system may display a first selected symbol in a lower-right symbol position of the selected symbol accumulation area. The gaming system may display subsequently selected symbols as filling the right-most column of the selected symbol accumulation area, and thereafter filling each respective column from right to left.

In one embodiment, the gaming system repeats this selection of symbols from the symbol pool until a designated number of symbols (such as the number of symbol positions of the selected symbol accumulation area) have has been selected. In another embodiment, the gaming system repeats this selection of symbols until a winning symbol combination is displayed for one of symbol matrices. In various embodiments, the gaming system prevents the selected symbol from being re-selected for the sequence of symbols by removing the selected symbol from the symbol pool or by flagging the selected symbol such that it is not eligible for re-selection.

In one embodiment, the gaming system selects symbols and determines matches until none of the symbol positions of the separate selected symbol accumulation area are empty. In this embodiment, after selecting the sequence of symbols, the gaming system determines whether to provide none, either, or both of a first award and a second award to the player.

In one embodiment, the first award is based on the symbols in the symbol positions of the plurality of bingo cards which match one of the drawn symbols. In this embodiment, the gaming system provides the first award based on one or more winning combinations of indicated symbol positions of the plurality of bingo cards. In one embodiment, a winning combination of indicated symbols is determined based on a predetermined pattern or spatial relationship between or a geometric shape of the indicated symbol positions. For example, the gaming system may provide a first award based on one or more geometric shapes formed by indicated symbol positions, the shapes including: horizontal lines, vertical lines, rectangles, diagonal lines, L-shapes, T-shapes, V-shapes, indicated corners, or other appropriate shapes.

In one embodiment, the second award (if any) is based on any winning combinations of the symbols displayed in the separate selected symbol accumulation area. In one embodiment, the second award is based on the order in which the gaming system selected the symbols during the play of the game. For example, the gaming system may provide the second award if an ascending sequence of numbers is displayed in one of the rows of the selected symbol accumulation area.

In one embodiment, in addition to any first award and any second award, the gaming system generates one or more bonus symbols for a play of the game. In one such embodiment, whether the gaming system generates such bonus symbols is based on any first award and/or any second award provided for the play of the game. In this embodiment, if the gaming system determines that the generation of one or more bonus symbols is appropriate, the gaming system selects one or more additional symbols from the symbol pool and determines any matches as discussed above. The gaming system provides any additional awards based on newly formed symbol combinations in the symbol matrices and/or in the selected symbol accumulation area.

It should be appreciated that the disclosed gaming system in one embodiment provides a player with an opportunity to play a bingo-type game wherein a first award is based on the geometric arrangement or spatial relationship of a plurality of matched symbols displayed in the symbol positions of one or more matrices of symbol positions and wherein a second award, independent of the indicated matched symbols of the plurality of matrices of symbol positions, is based on the sequence in which the symbols were drawn from the symbol pool.

Additional features and advantages are described in, and will be apparent from, the following Detailed Description and the figures.

BRIEF DESCRIPTION OF THE FIGURES

FIG. 3 is a flow chart of an example process for providing the game disclosed herein.

FIGS. 4A, 4B, 4C, and 4D are front perspective views of one embodiment of the gaming device disclosed herein illustrating a plurality of symbol matrices and a separate selected symbol accumulation area.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
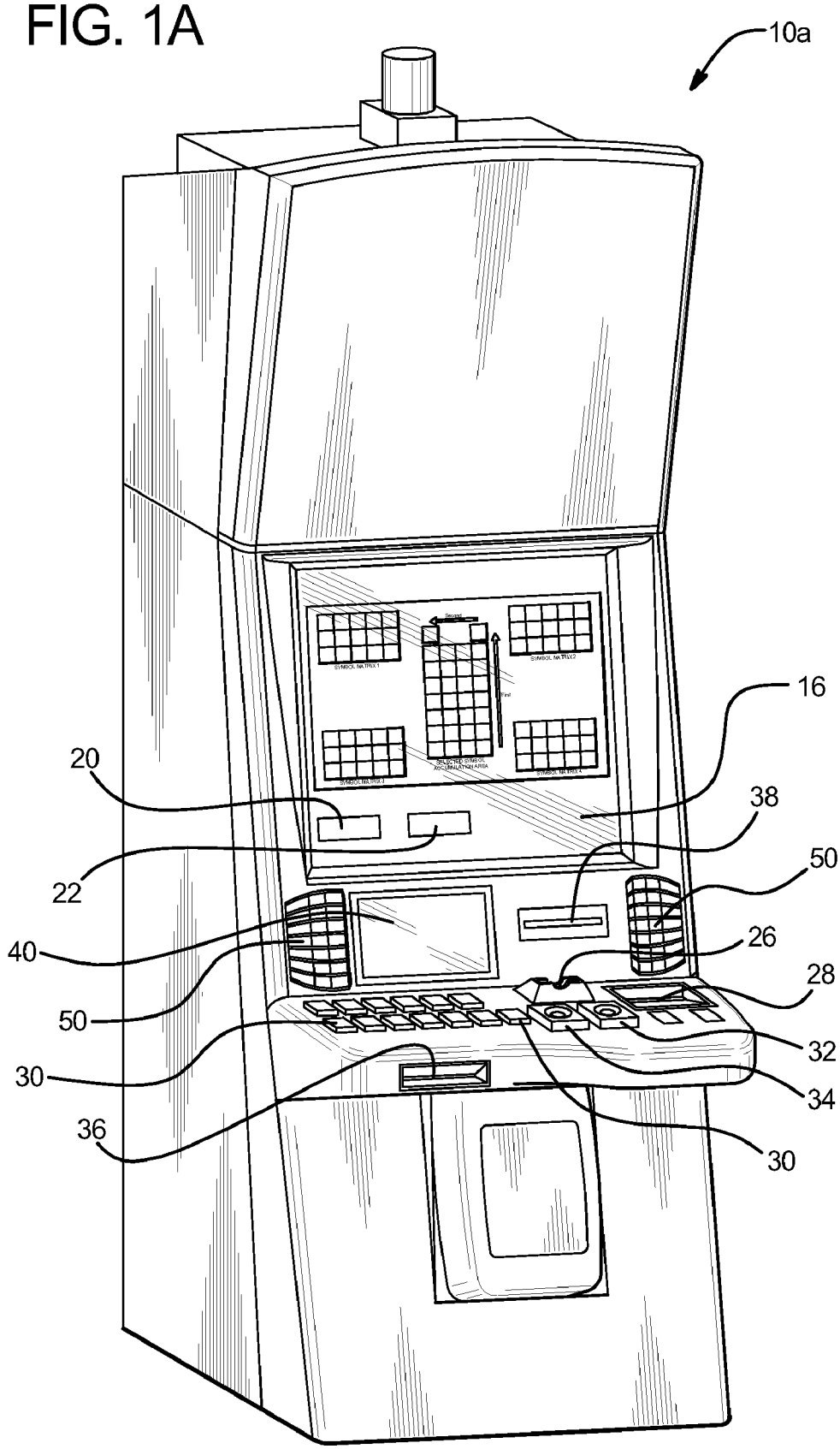
FIGS. 1A and 1B are perspective views of example alternative embodiments of the gaming device of the present disclosure.
Figure 1B:
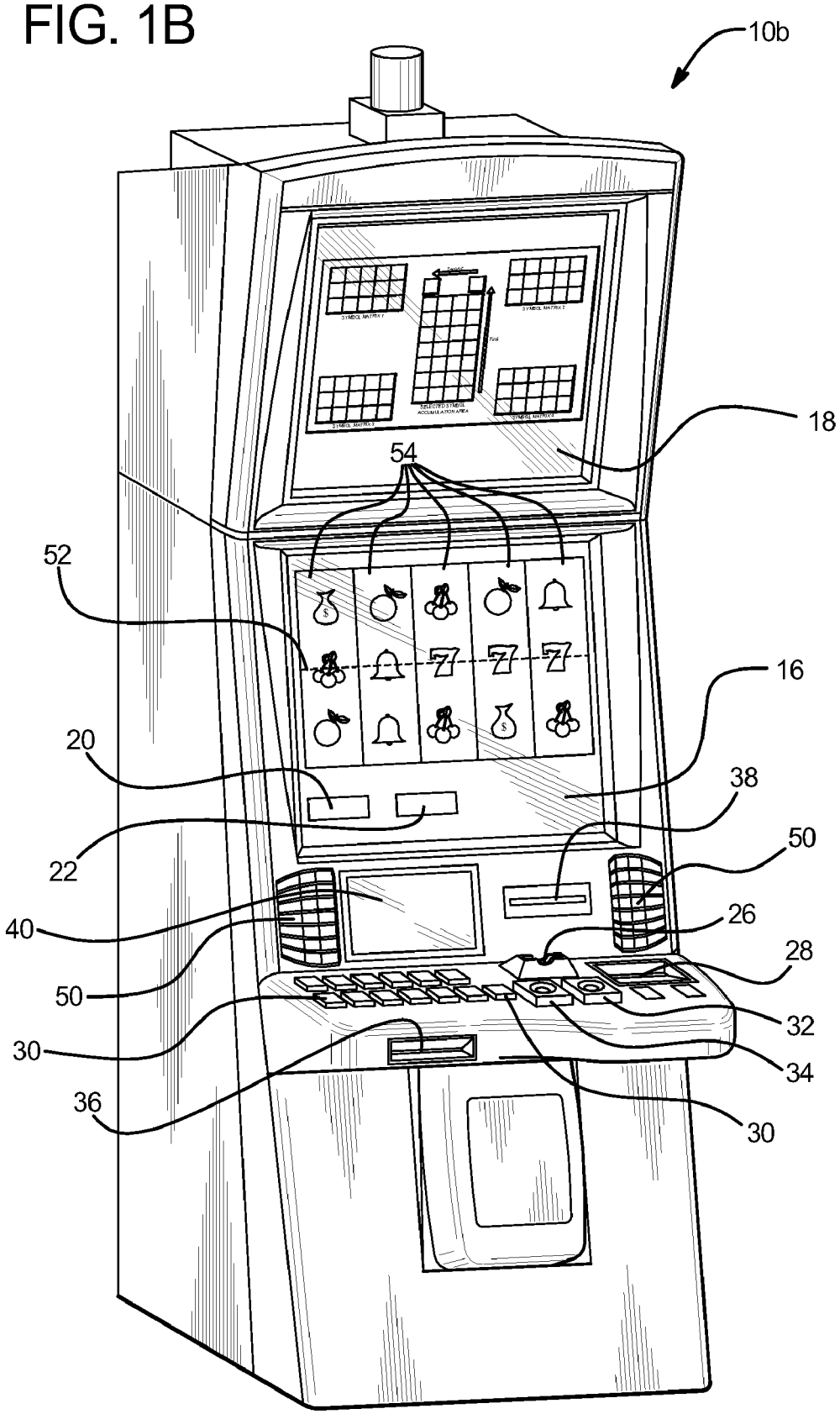

Referring now to the drawings, two example alternative embodiments of a gaming device disclosed herein are illustrated in FIGS. 1A and 1B as gaming device 10a and gaming device 10b, respectively. Gaming device 10a and/or gaming device 10b are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
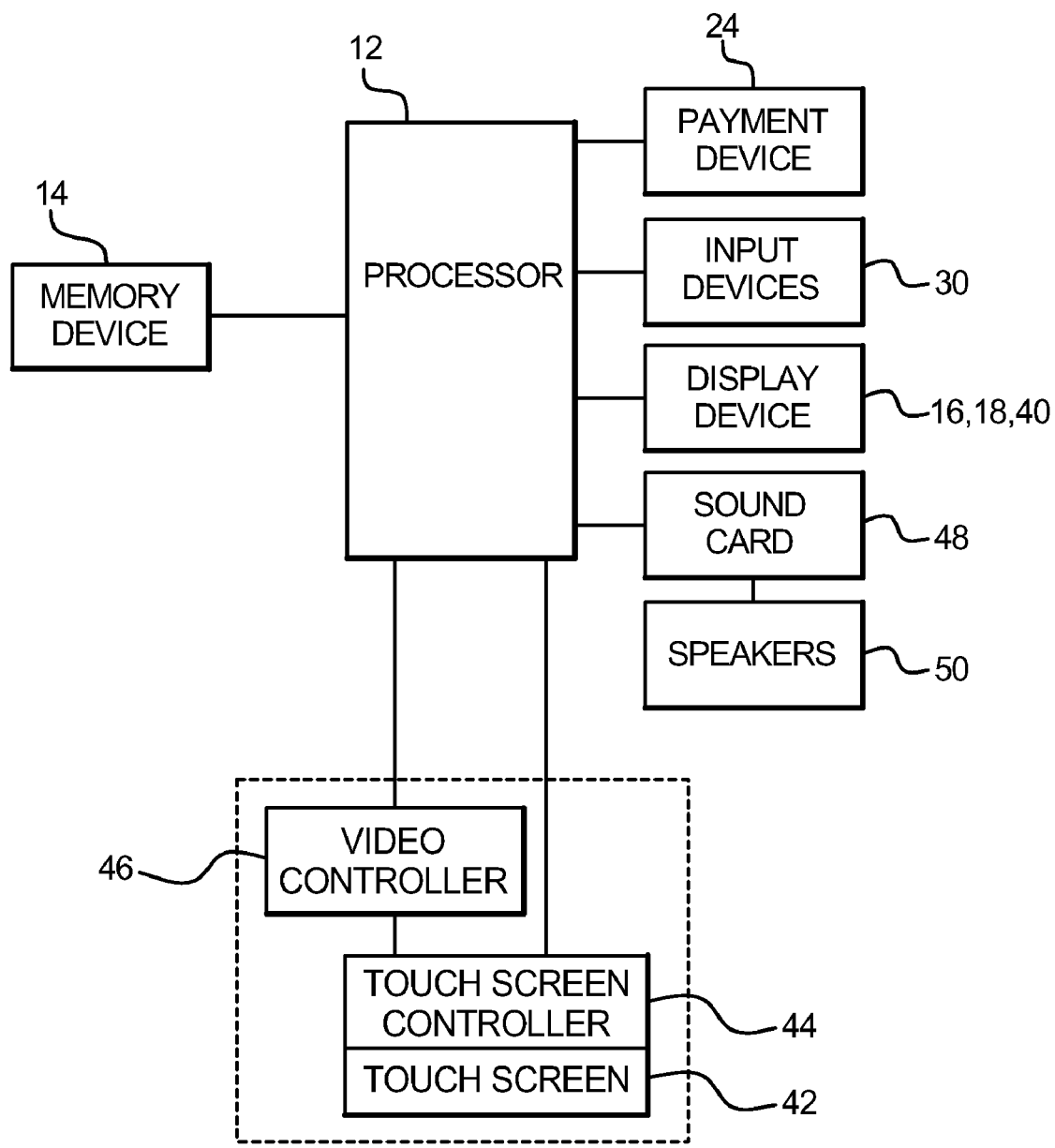
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASICs). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. In one embodiment, the bingo-type game disclosed herein is implemented as a base or primary game. The gaming machine or device may include some or all of the features of conventional gaming machines or devices. Alternatively, if the bingo-type game disclosed herein is implemented as a secondary game, the primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, if the bingo-type game disclosed herein is implemented as a secondary game, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, if the bingo-type game disclosed herein is implemented as a secondary game, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, if the bingo-type game disclosed herein is implemented as a secondary game, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the bingo-type game disclosed herein is implemented as a bonus or secondary game. In this embodiment, for an appropriate triggering event, the gaming device enables a player to play the disclosed bingo-type game and determines whether to provide none, one, or both of the disclosed first award and the disclosed second award. In another embodiment, the disclosed bingo-type game is implemented as both a base game and a bonus game. In this embodiment, the first award provided as disclosed is provided as a base game award, and the second award disclosed is provided as a bonus game award.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
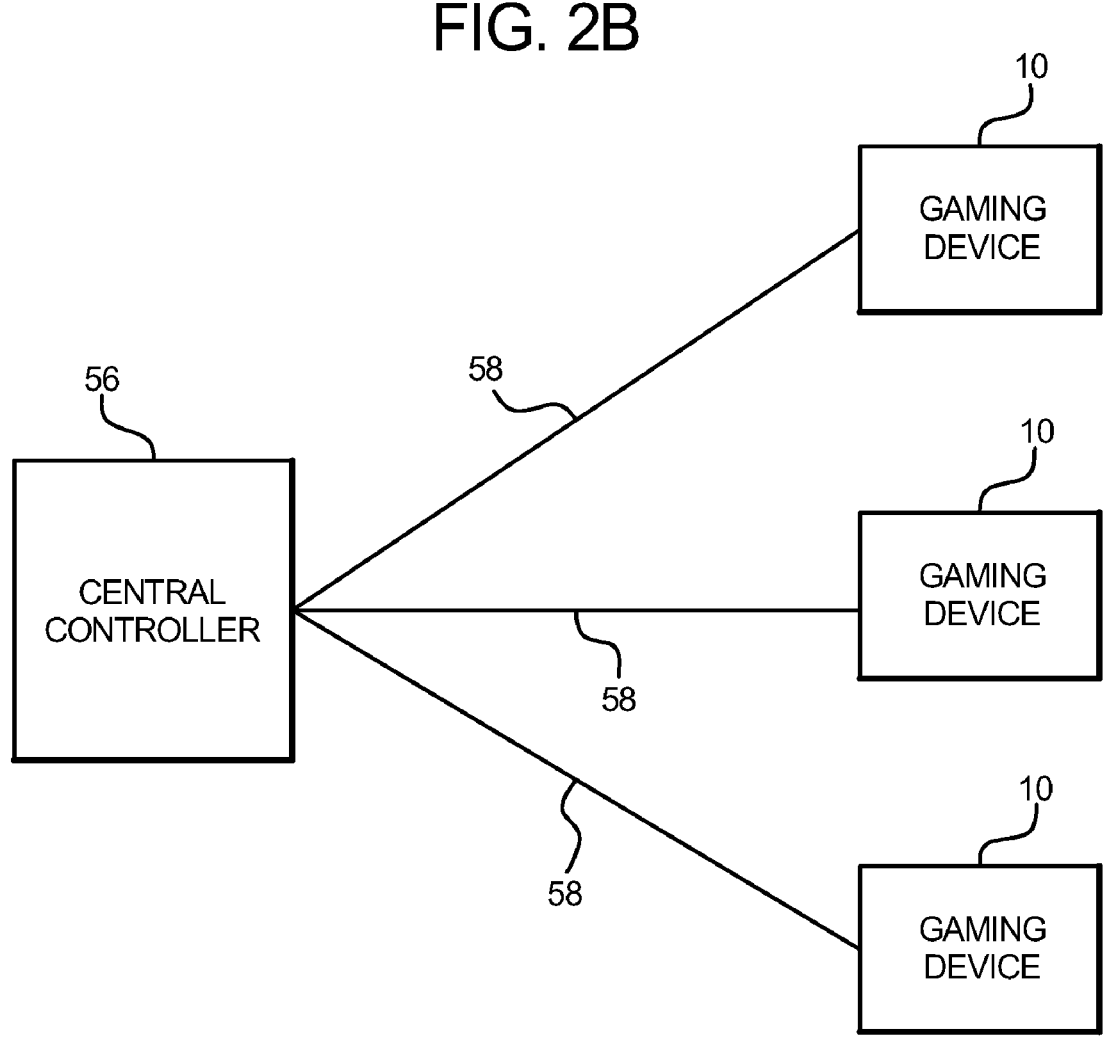
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In one embodiment, the gaming system disclosed herein utilizes both the first award (if any) and the second award (if any) in a class II gaming environment. That is, the gaming system determines such awards in the bingo-type game disclosed herein and displays such determined awards as the results of a slot game.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Game Having First Evaluation Based on Symbols Drawn from a Symbol Pool and Second Evaluation Based on Order of Symbols Drawn In one embodiment, the gaming system disclosed herein generates and displays a plurality of symbols in a plurality of symbol positions prior to a play of the game. In this embodiment, for the play of the game, the gaming system randomly selects a sequence of symbols from a symbol pool such that the sequence of symbols does not include any repeated symbols. In one embodiment, the gaming system provides a first award (if any) based on a combination of symbols displayed in the plurality of symbol positions which match one of the symbols of the selected sequence of symbols and provides a second award (if any) based on a combination of symbols determined by the order in which the selected sequence of symbols was selected from the symbol pool. In one embodiment, the sequence of symbols includes a designated number of symbols for the play of the game. In another embodiment, the gaming system continues selecting symbols for the sequence until either or both of the first award and the second award is provided to a player of the gaming system.

FIG. 3 illustrates a flow chart of an example embodiment of a process 100 for operating a gaming system providing the game disclosed herein. Although the example process 100 for operating the gaming system for providing the disclosed game is described with reference to the flow chart illustrated in FIG. 3, many other methods of operating a gaming system are contemplated. For example, the order of certain of the blocks may be changed, and certain of the blocks described are optional.

The disclosed gaming system enables a player to wager on a play of a game, as indicated by block 102. For the wager on the play of the game, the gaming system in one embodiment displays a plurality of matrices of symbol positions, as indicated by block 104. In one such embodiment, the gaming system displays four matrices of symbol positions arranged as bingo cards. It should be appreciated that in various embodiments, the plurality of symbol positions are alternatively grouped as sets, collections, or other appropriate groupings of symbol positions.

As further indicated by block 104, the gaming system also displays an additional or separate selected symbol accumulation area. In one embodiment, the separate selected symbol accumulation area is displayed as an initially empty matrix of symbol positions in which selected symbols can be displayed. In this embodiment, the quantity of empty symbols in the separate selected symbol accumulation area is equal to the quantity of symbols to be selected for the play of the game, as discussed below. In one embodiment, the gaming system displays the separate selected symbol accumulation area as a drawn numeral area of a bingo game.

In one embodiment, the gaming system generates and displays a plurality of symbols in each of the symbol positions of the matrices of symbol positions, as indicated by block 106. In one embodiment, the gaming system selects the symbols for populating the matrices of symbol positions from a symbol pool. In one such embodiment, the gaming system selects the symbols to display in the matrices of symbol positions such that each symbol is displayed once. In a further embodiment, the quantity of symbols in the symbol pool is equal to the quantity of symbol positions in the matrices of symbol positions. In this embodiment, each symbol from the symbol pool is displayed in one symbol position of one of the matrices.

In one embodiment, wherein the matrices of symbol positions are displayed as a plurality of bingo cards, the gaming system selects symbols for each of the symbol positions of each of the matrices based on a range of numerals associated with each column of each matrix. For example, the first column of a five column matrix of symbol positions may be associated with a first set of numerals. In this embodiment, the gaming system populates the symbol positions of the bingo cards with numerals within the range of numerals associated with each column.

In one embodiment, the gaming system begins the play of the game by randomly selecting a symbol from the symbol pool, as indicated by block 108. For each selected symbol for the play of the game, the gaming system indicates any symbol position of any of the matrices of symbol positions which displays a symbol matching the selected symbol, as indicated by block 110. In one embodiment, the gaming system also displays each selected symbol in the selected symbol accumulation area based on the order in which the symbol was drawn, as indicated by block 112. In an example embodiment, the gaming system displays the selected symbols in the order selected by beginning in one corner of the selected symbol accumulation area and displaying one of the selected symbols in each position of a first of a plurality of columns of the selected symbol accumulation area prior to displaying any selected symbol in a second column. As further indicated by block 112, the gaming system also removes each selected symbol from the symbol pool such that subsequent selections of symbols do not result in duplicate selections. In another embodiment, the gaming system does not remove selected symbols from the symbol pool; in this embodiment, the gaming system flags or otherwise stores an indication that the selected symbols have been selected, such that the symbols are not re-selected in the respective play of the game.

In one embodiment, the gaming system selects the plurality of symbols in a sequence representing a plurality of drawn symbols of a bingo game. In one such embodiment, the gaming system displays a representation that one of the numerals was drawn from a hopper of numerals, displays a representation of marking one of the squares of one of the bingo cards, and displays a representation of placing the drawn symbol in a caller area such as the caller area used to hold drawn numerals in a standard bingo game. It should be appreciated that in this embodiment, each symbol displayed in the caller area represents a symbol which may not be re-drawn.

If any empty symbol positions remain in the selected symbol accumulation area, as indicated by block 114, the gaming system repeats the selection and display as noted above. In one embodiment, the gaming system continues drawing bingo numerals until each of the positions in the caller area contains a drawn numeral. It should be appreciated that in various embodiments, the standard rules of bingo may or may not be followed (i.e., symbols may be drawn regardless of whether a winning combination of marked squares is displayed for one of the bingo cards). In one embodiment, the gaming system continues drawing bingo numerals until a designated quantity of numerals have been drawn. In another embodiment, the gaming system continues drawing bingo numerals until a winning symbol combination of matched symbols is displayed for one of the bingo cards.

In one embodiment, if displaying one of the selected symbols in the selected symbol accumulation area results in no empty positions in the selected symbol accumulation area, as indicated by block 114, the gaming system determines whether to provide a first award to the player for the play of the game, the first award being based on any winning combinations of matched symbols displayed in the matrices of symbol positions, as indicated by block 116. In one such embodiment, the gaming system determines such a first award based on a spatial arrangement of symbols in the matrices which are indicated to have been matched by one of the selected symbols. For example, the gaming system may provide an award based on a shape or spatial arrangement of indicated matched symbols in one of the matrices, such as a line, an "X" shape, a "V" shape, or four corners of the matrix.

In one embodiment, wherein each of the matrices of symbols is displayed as a bingo card, the gaming system provides the first award based on spatial arrangements of marked bingo squares which would result in a standard bingo award. For example, the gaming system may provide an award for a horizontal or vertical line of marked squares, a bingo card wherein each corner is marked, or a bingo card wherein a diagonal line of squares are marked, or a bingo card where any other suitable arrangement of squares are marked. It should be appreciated that such a first award may be characterized as a bingo award and may be provided as for a standard bingo game.

In one embodiment, the gaming system also provides one or more second awards based on any winning symbol combinations displayed in the selected symbol accumulation area, as indicated by block 118. In one embodiment, the gaming system determines such a second award based on a spatial arrangement of symbols in the secondary symbol display area. In further embodiments, the second award may or may not be based on an association or relationship between the spatially arranged symbols of the secondary display area.

It should be appreciated that the second award (if any) provided by the gaming system does not correspond to a standard bingo award. Specifically, the second award in one embodiment is provided independent of any marked, matched symbols of the plurality of bingo cards. Rather, the second award in this embodiment is based on the order in which a plurality of symbols are displayed in the selected symbol accumulation area—an area for which awards are not typically provided in a standard bingo game.

It should be appreciated that in one embodiment the first award provided for a play of the game of the disclosed gaming system is based on winning symbol combinations determined independent of an order in which the sequence of symbols is drawn from the symbol pool. It should also be appreciated that in one embodiment the second award provided for a play of the game of the disclosed gaming system is based on winning symbol combinations determined dependent on the order in which the sequence of symbols is drawn from the symbol pool. It should be further appreciated that the sequence of symbols is drawn from a symbol pool the contents of which decreases for the play of the game—that is, as each symbol is selected from the symbol pool, the symbol is removed from the pool such that the size of the symbol pool shrinks during a play of the game.

FIGS. 4A to 4D illustrate a play of the game disclosed herein according to the process 100 of FIG. 3. In the embodiment described below with respect to FIGS. 4A to 4D, the gaming system displays four matrices of symbol positions. Moreover, in the illustrated embodiment, each of the symbols of the symbol pool stored by the gaming system is a numeral in the range from one to sixty. It should be appreciated that in various embodiments, the symbols of the symbol pool are non-numerical, such as letters, pictures, or other suitable indicia.

FIG. 4A illustrates a front elevation view of one embodiment of a display device 16 of a gaming system as disclosed herein. In the illustrated embodiment, the gaming system displays four symbol matrices including symbol matrix 1 200a, symbol matrix 2 200b, symbol matrix 3 200c, and symbol matrix 4 200d. Each of the symbol matrices in the illustrated embodiment includes fifteen symbol positions 202 arranged in three rows of five columns each. In the illustrated embodiment, none of the symbol matrices are associated with a range of symbols.

The gaming system of the illustrated embodiment also displays a separate selected symbol accumulation area 210. In the illustrated embodiment, the separate selected symbol accumulation area 210 includes twenty eight accumulation positions 212, arranged as seven rows of four columns each. In the illustrated embodiment, the gaming system also displays two bonus symbol accumulation areas 214a and 214b. It should be appreciated that these bonus symbol accumulation areas 214a and 214b represent opportunities to win additional awards for a play of the game.

In one embodiment, the gaming system includes population indicators 220a and 220b for indicating to a player of the gaming system the scheme the gaming system will use to fill or populate the selected symbol accumulation area as symbols are drawn from a symbol pool. In the illustrated embodiment, the population indicators 220a and 220b are labeled as the first population indicator 220a and the second population indicator 220b. Thus, the population indicators 220a and 220b of the illustrated embodiment indicate that the gaming system will first fill the columns of the selected symbol accumulation area 210 (as indicated by first population indicator 220a). Second population indicator 220b indicates that the first column to be populated or filled will be the right-most column of the selected symbol accumulation area 210, and that as columns are populated or filled, new columns will be populated or filled from right to left. It should be appreciated that in various embodiments the population indicators 220a and 220b indicate that the columns are filled from the top to the bottom, or that a first row is populated or filled prior to a second row being populated or filled.

It should be appreciated that FIG. 4A illustrates the gaming system as disclosed herein prior to beginning a play of the game. Thus, none of the symbol positions or accumulation positions have a symbol displayed therein. In the illustrated embodiment, the gaming system also stores a symbol pool including sixty symbols, each of the symbols being one of the numerals between one and sixty. In various embodiments, prior to a play of the game as disclosed herein or at the beginning of the play of the game, the gaming system generates one of the symbols from the symbol pool for each symbol position 202 of each of the plurality of symbol matrices 200a, 200b, 200c, and 200d.

FIG. 4B illustrates the display of the game disclosed herein at a point midway through the generation and display of the plurality of symbols described above. As illustrated in FIG. 4B and as discussed above, prior to the play of the game, the gaming system generated a plurality of symbols from the symbol pool and displayed each generated symbol in one of the symbol positions of one of the four symbol matrices 200a, 200b, 200c, and 200d. Thus, in the illustrated embodiment, each of the numerals from one to sixty is displayed in one of the symbol positions of one of the symbol matrices. It should be appreciated that in the illustrated embodiment, none of the symbols of the symbol matrices 200a, 200b, 200c, or 200d are duplicated. That is, because there are four matrices of fifteen symbol positions each, the gaming system displays each of the numerals from one to sixty in exactly one symbol position of exactly one symbol matrix.

It should be appreciated that in various embodiments, one or more of the symbols of the symbol pool is displayed in fewer than one or in greater than one symbol position displayed by the disclosed gaming system. Moreover, in the illustrated embodiment, the gaming system generated the symbols from the symbol pool for display in the plurality of symbol positions. In another embodiment, the gaming system enables the player to select the symbol position of one or more of the symbols from the symbol pool for a play of the game.

Referring again to FIG. 4B, after generating the plurality of symbols for each of the plurality of symbol positions, the gaming system in one embodiment begins the play of the game by selecting a first symbol from the symbol pool for display in the selected symbol accumulation area 210. In the illustrated embodiment, the first symbol selected by the gaming system was the fifty-two symbol 216. The gaming system in the illustrated embodiment displays the fifty-two symbol 216 in the lower-right accumulation position of the separate selected symbol accumulation area 210. Moreover, the gaming system determines that the fifty-two symbol 216 selected from the symbol pool matches the generated fifty-two symbol 206 displayed in symbol matrix 2 200*b*. The gaming system in the illustrated embodiment indicates such a match by superimposing an "X" symbol over the fifty-two symbol 206 in the appropriate symbol position so symbol matrix 2 200*b*. Finally, the gaming system removes the fifty-two symbol from the symbol pool (not shown) such that future selections cannot result in a duplicate selection of the fifty-two symbol.

As illustrated by FIG. 4B, the gaming system serially selects a plurality of symbols from the symbol pool, repeating the steps described above with respect to the fifty-two symbol. It should be appreciated that the embodiment illustrated in FIG. 4B indicates that the gaming system has serially selected and displayed eleven symbols from the symbol pool, with the most recently selected symbol being the twenty-eight symbol. In the illustrated embodiment, for each symbol selected from the symbol pool, the gaming system determines whether the selected symbol matches one of the symbols of one of the symbol positions of one of the symbol matrices. If the selected symbol matches the symbol in one of the symbol positions, the gaming system indicates the match by displaying an "X" superimposed over the symbol in the symbol position. Moreover, the gaming system displays each selected symbol in the selected symbol accumulation area 210 according to the order indicated by the population indicators 220*a* and 220*b*. Thus, in the illustrated embodiment, the gaming system displays each selected symbol in the accumulation positions beginning in the bottom accumulation position of the right-most column, filling the accumulation positions of that column, and beginning again at the bottom of the next column from right-to-left.

As illustrated in FIG. 4B, the gaming system in one embodiment displays a status display area 230 on the display device 16. The status display area 230 displays messages about the status of the play of the game, such as about the status of the generation or selection of symbols. As illustrated, the status display area 230 of FIG. 4B indicates that the gaming system is playing the game by generating symbols and marking any matches that occur.

FIG. 4C illustrates one embodiment of the disclosed gaming system after selecting symbols from the symbol pool for the illustrated play of the game and after marking matches that occur for the generated symbols. In the illustrated embodiment, the gaming system has selected all twenty eight symbols to fill the accumulation positions of the selected symbol accumulation area 210. It should be appreciated that for the play of the game illustrated, the gaming system has not selected a symbol for either of bonus symbol accumulation positions 214*a* or 214*b*.

For each of the selected symbols, the gaming system has also indicated any matches for any of the symbol matrices 200*a*, 200*b*, 200*c*, or 200*d* by superimposing an "X" symbol on the appropriate symbol position of the appropriate symbol matrix. It should be appreciated that in the illustrated embodiment, the symbol pool stored by the gaming system at the point in time illustrated by FIG. 4C includes only thirty-two symbols. That is, the symbol pool includes the symbols that remain of the initial sixty symbols after removing the twenty-eight symbols displayed in the selected symbol accumulation area.

After the gaming system disclosed herein has selected the plurality of symbols to populate the accumulation positions, the gaming system analyzes the selected symbols and the matched symbols to determine whether to provide any award. Specifically, as illustrated in FIG. 4C, the gaming system determines whether to provide a first award and/or a second award to the player of the gaming system based on the plurality of matched symbols and based on the plurality of symbols of the selected symbol accumulation area.

In one embodiment, the gaming system provides the player a first award (if any) for a play of the game based on any winning combinations of indicated matched symbols displayed in any of the symbol matrices 200*a*, 200*b*, 200*c*, or 200*d*. In one embodiment, the gaming system determines whether such a winning symbol combination is displayed based on a spatial relationship between the plurality of indicated matched symbols of any of the plurality of symbol matrices. In the illustrated embodiment, the gaming system provides a first award if the indicated matched symbols of any of the symbol matrices 200*a*, 200*b*, 200*c*, or 200*d* form a combination of spatially related symbols including a horizontal line of five indicated symbols, a "V" symbol including five indicated symbols, or an inverted "V" symbol including five indicated symbols.

In one embodiment, the gaming system provides the player a second award (if any) for a play of the game based on any winning combinations of symbols displayed in the selected symbol accumulation area 210. In one embodiment, the gaming system determines whether such a winning symbol combination is displayed based on both a spatial relationship between the plurality of selected symbols in the accumulation positions and based on a relationship of the symbols which are in the spatial relationship. In the embodiment illustrated in FIG. 4C, the gaming system provides the second award if four symbols are displayed in the same row of the selected symbol accumulation area 210 and if those four symbols are arranged in sequentially increasing order from left to right. It should be appreciated that in different embodiments, the disclosed gaming system provides a second award based on winning symbol combinations which are displayed as horizontal lines, vertical lines, diagonal lines, or any other suitable pattern, shape, or spatial arrangement in the selected symbol accumulation area. It should be further appreciated that such a second award is still based on the symbols contained within the winning symbol combination.

For the play of the game illustrated in FIG. 4C, the gaming system provides the player with both a first award and a second award. The gaming system provides a first award for the winning symbol combinations 250*a* and 250*b* of symbol matrices 200*a* and 200*d*, respectively. Specifically, winning symbol combinations 250*a* and 250*b* each include five indicated symbols which are arranged in a horizontal line. Moreover, the gaming system provides a second award for the winning symbol combination 260 of the selected symbol accumulation area. Specifically, the winning symbol combination 260 includes four symbols (i.e., a sixteen symbol, a seventeen symbol, an eighteen symbol, and a nineteen symbol) arranged in sequential order in the same row of the selected symbol accumulation area 210. The gaming system indicates each of the winning symbol combinations (i.e., for both the first award and the second award) by appropriately highlighting the displayed combination of symbols 250*a*, 250*b*, and 260.

The status display area 230 of the display 16 of the gaming system displays a message indicating that the player received an award for generating winning symbol combinations 250a and 250b in symbol matrices 1 and 4 (i.e., 200a and 200d). Moreover, the status display area 230 of the display area 16 displays a message indicating that the player received an award for generating winning symbol combination 260 in the selected symbol accumulation area.

In one embodiment, the gaming system selects one or more bonus symbols from the symbol pool if the gaming system determines that the generated symbols result in the second award. In this embodiment, for each bonus symbol selected, the gaming system determines whether the selected bonus symbol matches any of the symbols displayed in the symbol positions of the symbol matrices. If so, the gaming system indicates such a match and displays the bonus symbol in one of the bonus symbol display areas 214a or 214b of the selected symbol accumulation area 210. The gaming system then determines whether the additionally indicated matched symbols result in additional winning symbol combinations for any of the symbol matrices 200a, 200b, 200c, or 200d. If additional winning symbol combinations are generated, the gaming system in one embodiment provides an additional award to the player based on the newly-generated winning symbol combinations.

Referring again to FIG. 4C, the gaming system in the illustrated embodiments determines that the generated symbols result in a second award, as indicated in the status display area 230. Thus, the gaming system determines that two bonus symbols will be generated for display in the bonus symbol display areas 214a and 214b. The gaming system indicates this determination in the status display area 230.

FIG. 4D illustrates the play of the game of the disclosed gaming system after the selection of the two additional bonus symbols. Specifically, the bonus system selects and displays two bonus symbols 262a and 262b in bonus symbol display areas 214a and 214b, respectively. In the illustrated embodiment, the additional symbols are a thirty-eight symbol 262a and a five symbol 262b. The gaming system determines that the bonus thirty-eight symbol 262a matches a thirty-eight symbol 270a displayed in symbol matrix 4 220d. The gaming system indicates this match by superimposing an "X" symbol on the thirty-eight symbol 270a displayed in the symbol matrix 220d. Similarly, the gaming system determines that the bonus five symbol 262b matches a five symbol 270b displayed in symbol matrix 4 220d, and superimposes an "X" symbol on the five symbol 270b.

After determining and indicating these additional matches, the gaming system analyzes the indicated matched symbols to determine whether any additional winning symbol combinations have been generated. In the illustrated embodiment, the gaming system determines that an additional winning symbol combination 280 has been generated for the matched symbols 270a and 270b which were matched by bonus symbols 262a and 262b. Specifically, the additional winning symbol combination 280 includes five symbols arranged in a "V" shape in symbol matrix 4 220d. The gaming system therefore provides an additional award based on the newly generated winning symbol combination 280.

The gaming system indicates the newly determined winning symbol combination in the status display area 230. In the embodiment illustrated in FIG. 4D, since no more bonus symbols may be generated, the play of the game ends and the gaming system provides the player an appropriate award for the three winning symbol combinations 250a, 250b, and 280 in the symbol matrices and the winning symbol combination 260 in the selected symbol accumulation area 210.

It should thus be appreciated that for the gaming system disclosed herein and illustrated at FIGS. 4A to 4D, each additional selection of a symbol (including bonus symbols) represents both an additional chance to win a first award and an additional chance to win a second award. It should be further appreciated that for the disclosed gaming system, the first award is based on a random arrangement of symbols matched for a plurality of selections of symbols from a symbol pool irrespective of an order in which the symbols were selected, and the second award is based on the order in which those symbols were selected from the symbol pool.

Figure 5:
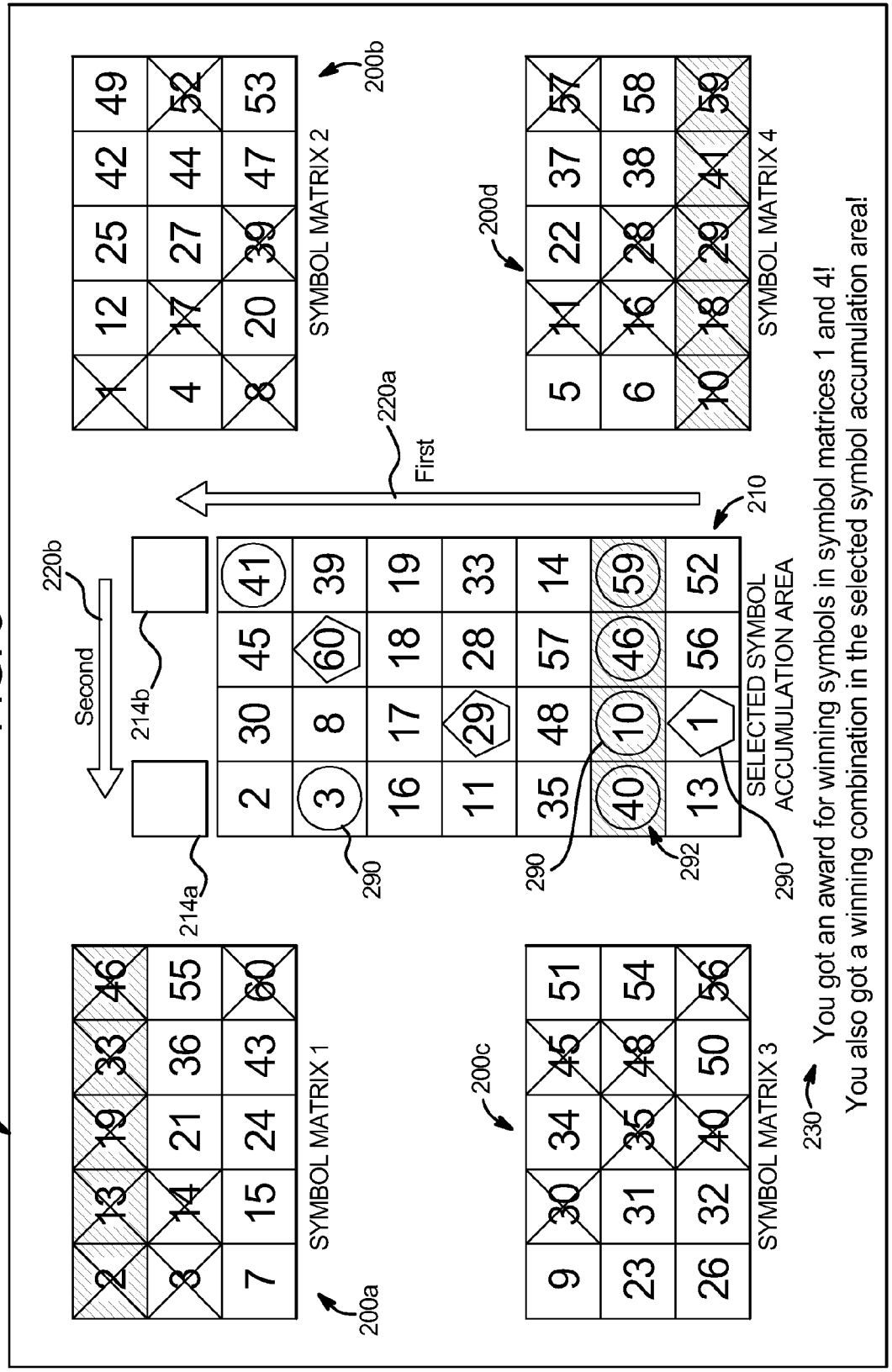
FIG. 5 is a front perspective view of an embodiment of the gaming device disclosed herein wherein each of the selected symbols of the selected symbol accumulation area includes an additional characteristic.

Referring now to FIG. 5, at least one of the plurality of symbols of the symbol pool in one embodiment includes at least one additional characteristic in addition to the symbol displayed in the symbol position of the symbol matrix during generation of the plurality of symbols for the plurality of symbol positions. In the illustrated embodiment, the symbols of the symbol pool are numerals which are displayable in the plurality of symbol matrices. In this embodiment, a plurality of the symbols 290 generated for the play of the game also includes an associated shape such as a circle or a pentagon. In the illustrated embodiment, not all of the symbols of the symbol pool include such associated shapes. In one embodiment, each of the symbols of the symbol pool includes such an associated shape. In another embodiment, none of the symbols of the symbol pool initially include an associated shape; rather, the gaming system determines whether to associate a shape with a symbol at the time the symbol is selected from the symbol pool for display in the selected symbol accumulation area 210. In various embodiments, which symbols include associated shapes is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

Referring still to FIG. 5, the gaming system of the illustrated embodiment provides the second award if a winning combination of four symbols having the same associated shape is generated for the same row of the separate selected symbol accumulation area 210. Thus, in the illustrated embodiment, the gaming system determines that winning symbol combination 292 has been generated based on the four symbols of winning symbol combination 292 which each includes an associated circle shape. In this embodiment, the gaming system provides the second award to the player based on the winning combination 292 including four symbols with the same associated shape. The gaming system indicates the second award by displaying an appropriate message in the status display area 230.

It should be appreciated that in the illustrated embodiment, the gaming system is not configured to generate any bonus symbols in the bonus symbol display areas 214a or 214b for a winning combination of symbols 292 displayed in the selected symbol accumulation area. In various embodiments (not shown), the gaming system generates one or more bonus symbols and makes one or more additional determinations whether additional winning symbol combinations have been generated in any of the symbol matrices 200a, 200b, 200c, or 200d for the play of the game. It should be appreciated that in one embodiment, the bonus symbols generated from the symbol pool include one or more associated shapes and may be included in one or more winning symbol combinations of the selected symbol accumulation area.

In one embodiment, the gaming system disclosed herein is configured to simultaneously display the play of the game to a plurality of players at a plurality of gaming devices. In one such embodiment, the gaming system displays or provides a single bingo card of a plurality of bingo cards to each of the plurality of players. In one embodiment, the selected symbol accumulation area represents an opportunity for any of the players of the gaming system to win an award for a play of the game. It should be appreciated that in this embodiment, one or more of the bingo cards may include one or more of the same numbers as another bingo card associated with another player.

In one embodiment, for a play of the game wherein the gaming system provides a bingo card to each of the players, the gaming system selects a plurality of symbols from a pool of symbols. For each selected symbol, the gaming system in this embodiment determines whether that selected symbol matches a symbol displayed in a symbol position of any of the plurality of bingo cards. In this embodiment, the gaming system indicates such a match by displaying a mark on any appropriate bingo cards. In one embodiment, the gaming system continues selecting symbols from the pool of symbols until a winning symbol combination of marked symbols is displayed on at least one of the bingo cards. When such a winning symbol combination is displayed, the gaming system provides the first award to the player whose card displays the winning symbol combination.

In one embodiment, the gaming system continues selecting symbols until at least one winning symbol combination is displayed on each bingo card. In various embodiments, the quantity of symbols selected and marked on the bingo cards is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria. In one embodiment, the gaming system provides a single player with more than one bingo card. In one such embodiment, the gaming system continues to select symbols until at least one winning symbol combination is displayed on at least one bingo card of each player. In another such embodiment, the gaming system continues selecting symbols until at least one winning symbol combination is displayed on at least one bingo card, as discussed above.

In one embodiment, for each selected symbol, the gaming system also displays the symbol in the selected symbol accumulation area in the order in which the symbol was selected. For example, the gaming system fills the matrix representing the selected symbol accumulation area by filling each column from bottom to top, and by filling the columns from left to right as the symbols are selected, as discussed herein.

In one embodiment, the gaming system provides a second award to one or more of the players if a winning symbol combination is displayed in the selected symbol accumulation area for a play of the game. For example, the gaming system provides a second award if a sequence of numbers is displayed in one of the rows of the selected symbol accumulation area. It should be appreciated that such second awards are based on the order in which the symbols were selected for the play of the game.

In one embodiment, the gaming system provides a second award based on any symbols displayed in the selected symbol accumulation area when one of the players wins the first award. In another embodiment, the gaming system continues selecting symbols until the selected symbol accumulation area does not display any empty symbol positions. In one embodiment, the gaming system continues selecting symbols until a winning symbol combination is displayed in the selected symbol accumulation area. In one embodiment, after determining that a winning symbol combination is displayed for one of the bingo cards, the gaming system selects at least one additional symbol and displays that symbol in the selected symbol accumulation area without determining whether the selected symbol is displayed in any symbol position of any of the bingo cards. In various embodiments, the quantity of symbols displayed in the selected symbol accumulation area is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, which is not shown, the gaming system enables the player to wager on subsequent plays of the game using a same arrangement of generated symbols within the symbol positions of the symbol matrices from a previous play of the game. In another embodiment, the gaming system enables the player to wager on subsequent plays of the game using a different or new generation of the plurality of symbols in the symbol positions of the symbol matrices.

In one embodiment, wherein the disclosed game is implemented as a four-card bingo game, the gaming system displays each of the symbol matrices as a separate bingo card. In this embodiment, the gaming system displays each of the generated symbols as a numeral in one of a plurality of sections (such as squares) of the bingo cards. As the gaming system selects symbols for a play of the game, the gaming system displays the selected symbols as balls including numerals being dispensed from a bingo hopper. The gaming system in one embodiment displays the indicated matched symbols as being marked as in a bingo game, such as having an "X" drawn through the indicated matched symbol, or having a marker placed on top of the indicated matched symbol. It should be appreciated that in one embodiment, the selected symbol accumulation area is displayed as a plurality of tubes, each tube representing one of the columns, wherein the balls drawn from the hopper are dropped sequentially into one of the tubes.

In one embodiment, for the wager on the play of the game, the gaming system enables a player to assign one of the numerals from the pool of numerals to each of the symbol positions of the bingo cards. In this embodiment, the gaming system prevents the player from assigning a numeral from the pool of numerals to a symbol position having a range within which the numeral does not fall. In a further embodiment, the gaming system enables the player to assign each numeral from the pool of numerals to one and only one symbol position.

In various embodiments, the gaming system displays each of the sets of symbols as a set of symbols arranged in a shape other than a matrix, such as such as a set having a plurality of annular areas, each annular area including at least one symbol position. In one embodiment, at least one of the sets of symbols is displayed as having a different shape than at least one other set of symbols. It should be appreciated that the gaming system disclosed herein may display the sets in any suitable way such that a winning combination of matched symbols can be determined.

It should be appreciated that in various embodiments, the additional characteristic of the at least one symbol includes a characteristic other than an associated shape. For example, the additional characteristic may include a symbol color, a symbol size, an animation associated with the symbol, or a suit of a card from a standard deck of cards associated with the symbol.

In various embodiments, the second award is based on the characteristics of a plurality of symbols in a symbol combination displayed in the selected symbol accumulation area, wherein the characteristics are unrelated to the numeral associated with the symbol. For example, the second award may be based on a combination of symbols having a same color, a combination of symbols having a same suit of a standard deck of cards, a combination of symbols having one symbol of each of a plurality of colors, or a combination of symbols having one symbol of each of four suits of a standard deck of cards. In a further embodiment, the second award is based on both the numeral associated with each symbol of a combination of symbols, as well as on the characteristics of the symbols of the combinations of symbols. For example, the second award may include a first value for a "straight"—that is, a combination of symbols having sequentially ascending or descending values, and may include a second, different value for a "straight flush"—that is, a combination of symbols having sequentially ascending or sequentially descending values and having the same suit of a standard deck of cards.

In various embodiments, the game disclosed herein is implemented as base game, a bonus game, or a combination base and bonus game. For example, the gaming system may provide the first award (if any) to the player as a base or primary game award, and may provide the second award (if any) to the player as a bonus or secondary game award. In one embodiment, the sum of first award and the second award constitutes a primary game award. In another embodiment, the sum of the first award and the second award constitutes a bonus game award. In one embodiment, the gaming system disclosed herein provides an award for the bonus game if the player has satisfied a bonus game eligibility condition. In one such embodiment, the bonus game eligibility condition is satisfied by the player placing a bonus game eligibility wager.

In one embodiment, the gaming system disclosed herein populates the symbol positions of the separate selected symbol accumulation area in any appropriate way based on the order in which the symbols are selected. In one embodiment, the gaming system fills one of the columns of the separate selected symbol accumulation area prior to beginning to fill another of the columns. In another embodiment, the gaming system fills one of the rows of the selected symbol accumulation area prior to filling another one of the rows. In another embodiment, the gaming system fills an outer perimeter of the selected symbol accumulation area prior to filling any of the symbol positions of an inner area. It should be appreciated that the gaming system may utilize any appropriate scheme for filling the selected symbol accumulation area.

In one embodiment, during selection of the plurality of symbols from the symbol pool for a play of the game, the gaming system does not remove a selected symbol from the symbol pool upon selection. In this embodiment, the gaming system instead stores data indicating that the symbol has been selected. In one embodiment, if the gaming system randomly selects a symbol which has data stored indicating that the symbol has been previously selected, the gaming system re-selects a symbol from the symbol pool. It should be appreciated that in this embodiment, the gaming system does not select the same symbol more than once for a play of the game.

In another embodiment, the gaming system randomly selects a plurality of symbols, in sequence, from the symbol pool without removing or otherwise indicating that the selected symbols have been selected. In this embodiment, the gaming system can select the same symbol twice for the same play of the game. It should be appreciated that in various embodiments, one or more winning combinations for a play of the game may be based on at least one matched symbol being matched more than once for a play of the game, or on a plurality of the symbols of the selected symbol accumulation area being the same symbol.

In one embodiment, the gaming system does not generate and display each symbol of the symbol pool in one of the symbol positions of one of the matrices for a play of the game. In one such embodiment, the symbol pool includes more symbols than the total quantity of symbol positions. In this embodiment, one or more symbols from the symbol pool are not displayed in any symbol position. It should be appreciated that in this embodiment, for a play of the game, one or more selected symbols displayed in the selected symbol accumulation area may not result in a matched symbol of one of the symbol positions.

In one embodiment, the gaming system selects approximately half of the total quantity of symbols in the symbol pool for a play of the game. In various other embodiments, the gaming system selects more or less than approximately half of the total quantity of symbols in the symbol pool for the play of the game. It should be appreciated that more symbols selected and displayed in the selected symbol accumulation area for a play of game increase the likelihood that the gaming system will generate one or more winning symbol combinations in one or more of the symbol matrices. Similarly, fewer symbols selected for a play of the game as a percentage of the quantity of symbol positions decreases the likelihood that a winning symbol combination will be generated for one or more of the symbol matrices.

In one embodiment, the gaming system provides the second award for a play of the game, wherein the second award is not based on a pattern or spatial relationship of symbols displayed in the selected symbol accumulation area. In this embodiment, any second award for the play of the game is based on the presence of a plurality of symbols of a winning symbol combination in the secondary symbol accumulation area. It should be appreciated that in one embodiment, this second award contrasts with the first award, which is based on patterns or spatial relationships of symbols displayed in the plurality of symbol matrices without regard for which symbols are included in the patterns or spatial relationships.

In one embodiment, the gaming system provides an award for a plurality of numerical symbols which satisfy a mathematical relationship. In one such embodiment, the gaming system provides a second award if a combination of symbols includes only odd numerals. In another such embodiment, the gaming system provides a second award if a combination of symbols includes only even numerals. In various embodiments, the gaming system provides a second award if a combination of symbols includes symbols each selected from a designated range or group of symbols, has a sum exceeding a threshold sum, has a sum which is less than a threshold sum, includes only prime numerals, includes numerals ending in a same digit (i.e., numeral symbols of twenty-one, thirty-one, forty-one, and fifty-one), includes numerals beginning in the same digit (i.e., numeral symbols of twenty-one, twenty-four, twenty-six, twenty-nine, and twenty-three), includes numerals with a common factor (i.e., numeral symbols of four, sixteen, twenty-four, and twenty-eight), or has any other suitable relationship. In one embodiment, the gaming system provides any second award based on a winning combination of symbols selected from a given range or grouping of symbols (i.e., symbols from the range of numerals between twenty and twenty-five). It should be appreciated that such winning symbol combinations may be displayed in any pattern or spatial arrangement, such as horizontal lines, vertical lines, diagonal lines, or any other suitable pattern or spatial arrangement.

In various embodiments, wherein the symbols of the symbol pool are not numerals (and wherein the game is not implemented as a modification to a standard bingo game), the matrices of symbol positions may be displayed in accordance with the symbols. In one such embodiment, the symbol pool represents a standard deck of playing cards and the symbol matrices represent hands of a card game. In this embodiment, the symbol matrices include a plurality of playing card positions, and a play of the game is displayed as a dealer dealing cards to a plurality of hands. Further, in this embodiment the first award is based on a winning hand according to a set of rules for a card game such as based on standard poker hand strength, and the second award is based on a combination of the dealt cards based on the order in which the cards are dealt.

In one embodiment, the gaming system determines whether to select one or more bonus symbols from the symbol pool based on the symbols displayed in the selected symbol accumulation area. Generally, the gaming system determines the displayed symbols (or the associated characteristics of the displayed symbols) form a designated combination as displayed in the selected symbol accumulation area. In various embodiments, the gaming system determines whether to select one or more bonus symbols from the symbol pool based on a combination of sequential symbols displayed in a single row in the selected symbol accumulation area, based on a combination of sequential symbols arranged within the same row of the selected symbol accumulation area, based on a common characteristic of a plurality of symbols in the same row of the selected symbol accumulation area, or based on a common characteristic of a plurality of symbols in the same column of the selected symbol accumulation area. In still other embodiments, the determination whether to select one or more bonus symbols is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the selection of one or more bonus symbols for a play of the game does not modify the award provided unless additional winning symbol combinations are generated in the symbol matrices. In an alternative embodiment, the bonus symbols modify an award already received for a play of the game, such as by applying a multiplier to an award, thus increasing the award by a determined amount. In various embodiments, the amount by which the award is increased or modified is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the disclosed gaming system enables a player to cause a change in the displayed order of the symbols of the selected symbol display area. In one such embodiment, the gaming system enables such a change by enabling a player to select the position of one or more of the symbols of the selected symbol display area. In another such embodiment, the gaming system is configured to change the position of one or more of the symbols of the selected symbol accumulation area by randomly determining a position for the symbol. In one embodiment, the gaming system enables such changes to the positions of the symbols of the selected symbol accumulation area based on a wager on a play of the game. In other embodiments, whether the gaming system enables such changes to the displayed order is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
   at least one display device,
   at least one input device,
   at least one processor, and
   at least one memory device which stores a plurality of instructions, which when executed by the at least one processor, cause the at least one processor to operate with the at least one display device and the at least one input device, for a play of a game, to:
   (a) generate and display at least one bingo card, each bingo card including a plurality of different symbols of a symbol pool;
   (b) randomly select one of the symbols of the symbol pool;
   (c) display a match indication for the symbol of any bingo card which matches the selected symbol;
   (d) sequentially display the selected symbol in a separate selected symbol accumulation area;
   (e) repeat (b) to (d) until a designated quantity of the symbols has been selected from the symbol pool;

(f) thereafter, determine a first award based on any winning combination of match indications displayed on any of said bingo cards;

(g) determine an additional second award based on any designated combination of symbols being displayed in at least one of a plurality of predetermined spatial arrangements in the separate selected symbol accumulation area; and (h) provide a player with any determined first award and any determined additional second award for the play of the game.

2. The gaming system of claim 1, wherein the designated quantity of the symbols is based on a quantity of symbol positions of the separate selected symbol accumulation area.

3. The gaming system of claim 1, wherein the designated quantity of the symbols is based on whether any winning combination of match indications is displayed on any of the bingo cards, such that the plurality of instructions, when executed by the at least one processor, cause the at least one processor to repeat (b) to (d) until at least one winning combination of match indications is displayed on at least one bingo card.

4. The gaming system of claim 1, wherein each of said symbols of said symbol pool includes an additional characteristic selected from the group consisting of: a number, a color, a shape, a suit of a standard deck of cards, and a non-numerical indicia.

5. The gaming system of claim 4, wherein the designated combination of symbols displayed in the separate selected symbol accumulation area is based on a common one of the characteristics of a plurality of the symbols displayed in the separate selected symbol accumulation area.

6. The gaming system of claim 1, wherein the winning combination of match indications displayed on one of the bingo cards includes a plurality of match indications displayed as having at least one designated spatial arrangement selected from the group consisting of: being arranged in a horizontal line, being arranged in a vertical line, being arranged around a perimeter, being arranged in a V-shape, and being arranged in an X-shape.

7. The gaming system of claim 1, wherein the plurality of predetermined spatial arrangements include at least one selected from the group consisting of: being arranged in a horizontal line, being arranged in a vertical line, being arranged around a perimeter, being arranged in a V-shape, and being arranged in an X-shape.

8. The gaming system of claim 1, wherein the plurality of instructions, when executed by the at least one processor, cause the at least one processor to operate with the at least one display device to provide the player with any determined additional second award by randomly selecting an additional symbol from the symbol pool, displaying the match indication for the symbol of any of the bingo cards which matches the additional selected symbol, and displaying the additional selected symbol in the separate selected symbol accumulation area.

9. The gaming system of claim 8, wherein the plurality of instructions, when executed by the at least one processor, cause the at least one processor to determine a third award based on one selected from the group consisting of: any newly displayed winning combination of match indications for the at least one bingo card and any newly displayed designated combination of symbols being displayed in at least one of the plurality of predetermined spatial arrangements in the separate selected symbol accumulation area, and to provide any determined third award to the player.

10. The gaming system of claim 1, wherein the at least one bingo card includes a plurality of bingo cards, and wherein the plurality of instructions, when executed by the at least one processor, cause the at least one processor to operate with the at least one input device to enable a plurality of players to wager on the play of the game and to provide the first award to one of the plurality of players based on which of the plurality of bingo cards displayed any winning combination of match indications.

11. The gaming system of claim 1, wherein the plurality of instructions, when executed by the at least one processor, cause the at least one processor to operate with the at least one display device to generate and display the at least one bingo card by randomly selecting a different subset of the plurality of symbols for each of the at least one bingo card.

12. The gaming system of claim 1, wherein each bingo card includes a plurality of columns, each column being associated with a range of symbols, and wherein the plurality of instructions, when executed by the at least one processor, cause the at least one processor to operate with the at least one display device to generate and display each bingo card by selecting and displaying symbols from among the plurality of different symbols based on the range of symbols associated with each column of each bingo card.

13. A gaming system comprising:
at least one display device,
at least one input device,
at least one processor, and
at least one memory device which stores a plurality of instructions, which when executed by the at least one processor, cause the at least one processor to operate with the at least one display device and the at least one input device, for a play of a game, to:

(a) generate and display a plurality of sets of symbols, each of the symbols of each of the sets of symbols being one of a pool of symbols;

(b) randomly select a sequence of symbols from the pool of symbols, said sequence including a plurality of selected symbols, wherein each selected symbol of the sequence can only be selected once;

(c) for each selected symbol of the sequence of symbols:
(i) display a match indicator for any symbol of any of the plurality of sets of symbols which matches the selected symbol, and
(ii) display said selected symbol in a separate selected symbol accumulation area based on an order of selection of said selected symbol;

(d) determine a first award based on any winning combination of match indicators displayed for the plurality of sets of symbols;

(e) if any designated combination of selected symbols is displayed in at least one of a plurality of predetermined spatial arrangements in the separate selected symbol accumulation area:
(i) determine an additional second award based on said designated combination of selected symbols,
(ii) randomly select at least one bonus symbol from the plurality of symbols,
(iii) repeat (c)(i) and (c)(ii) for the selected bonus symbol, and
(iv) determine a bonus third award based on any newly generated winning combinations of match indicators displayed for the plurality of sets of symbols and also based on any newly generated designated combinations of selected symbols displayed in at least one of the plurality of predetermined spatial arrangements in the separate selected symbol accumulation area; and
(f) provide any determined first award, any determined additional second award, and any determined bonus third award to a player for said play of the game.

14. The gaming system of claim 13, wherein the plurality of instructions, when executed by the at least one processor, cause the at least one processor to randomly select the sequence of symbols from the pool of symbols by:
(v) selecting one of the symbols from the pool of symbols;
(vi) removing said selected symbol from the pool of symbols; and
(vii) repeating (v) and (vi) at least once.

15. The gaming system of claim 14, wherein the plurality of instructions, when executed by the at least one processor, cause the processor to repeat (v) and (vi) until a designated quantity of the symbols has been selected for the sequence of symbols.

16. The gaming system of claim 15, wherein the designated quantity of the symbols is based on a quantity of symbol positions of the separate selected symbol accumulation area.

17. The gaming system of claim 15, wherein the designated quantity of the symbols is based on whether any winning combination of match indicators is displayed for any of the sets of symbols, such that the plurality of instructions, when executed by the at least one processor, cause the at least one processor to repeat (v) and (vi) until at least one winning combination of match indicators is displayed for at least one set of symbols.

18. The gaming system of claim 13, wherein at least one of said symbols of said pool of symbols includes an additional characteristic selected from the group consisting of: a number, a color, a shape, a suit from a standard deck of cards, and a non-numerical indicia.

19. The gaming system of claim 18, wherein the additional second award is also based on the additional characteristics of each of the plurality of symbols of any designated combination of said selected symbols.

20. The gaming system of claim 13, wherein the winning combination of match indicators displayed for one of the sets of symbols includes a plurality of match indicators displayed as having at least one designated spatial arrangement selected from the group consisting of: being arranged in a horizontal line, being arranged in a vertical line, being arranged around a perimeter, being arranged in a V-shape, and being arranged in an X-shape.

21. The gaming system of claim 13, wherein the plurality of predetermined spatial arrangements include at least one selected from the group consisting of: being arranged in a horizontal line, being arranged in a vertical line, being arranged around a perimeter, being arranged in a V-shape, and being arranged in an X-shape.

22. The gaming system of claim 13, wherein the plurality of instructions, when executed by the at least one processor, cause the at least one processor to enable a plurality of players to wager on the play of the game, each of the plurality of sets of symbols being associated with one of the players, and to provide any determined first award to the player associated with the set of symbols which displayed any winning combination of match indicators.

23. The gaming system of claim 13, wherein each of the plurality of sets of symbols is displayed as a bingo card and wherein the pool of symbols includes a plurality of numeral symbols.

\* \* \* \* \*

UNITED STATES PATENT AND TRADEMARK OFFICE
CERTIFICATE OF CORRECTION

PATENT NO. : 8,128,478 B2  
APPLICATION NO. : 12/267873  
DATED : March 6, 2012  
INVENTOR(S) : Adam M. Meyer It is certified that error appears in the above-identified patent and that said Letters Patent is hereby corrected as shown below:

IN THE CLAIMS:

In Claim 1, Column 35, Line 2, delete the second instance of "of."

In Claim 1, Column 35, Line 3, delete "said" and replace "cards" with --card--.

In Claim 3, Column 35, Line 18, delete "of the."

In Claim 3, Column 35, Line 19, replace "cards" with --card--.

In Claim 8, Column 35, Line 54, delete "of the" and replace "cards" with --card--.

Signed and Sealed this  
Tenth Day of July, 2012

David J. Kappos  
*Director of the United States Patent and Trademark Office*